US012669828B1

(12) United States Patent
Soyarslan

(10) Patent No.: US 12,669,828 B1
(45) Date of Patent: Jun. 30, 2026

(54) DISTRIBUTED VECTOR-DRAG DRONE SWARM SYSTEM FOR DYNAMIC POSITIONING

(71) Applicant: LEATRON LLC, Dover, DE (US)

(72) Inventor: Osman Levent Soyarslan, Istanbul (TR)

(73) Assignee: LEATRON LLC, Dover, DE (US)

( * ) Notice: Subject to any disclaimer, the term of this patent is extended or adjusted under 35 U.S.C. 154(b) by 0 days.

(21) Appl. No.: 19/375,872

(22) Filed: Oct. 31, 2025

Related U.S. Application Data

(60) Provisional application No. 63/857,759, filed on Aug. 5, 2025.

(51) Int. Cl.
G05D 1/611 (2024.01)
B63B 79/10 (2020.01)
(Continued)

(52) U.S. Cl.
CPC .............. G05D 1/611 (2024.01); B63B 79/10 (2020.01); G05D 1/495 (2024.01); G05D 2109/38 (2024.01)

(58) Field of Classification Search
CPC .... G05D 1/611; G05D 1/495; G05D 2109/38; B63B 79/10
See application file for complete search history.

(56) References Cited

U.S. PATENT DOCUMENTS 4,299,184 A    11/1981  Mougin
4,487,384 A    12/1984  Astrand
(Continued)

FOREIGN PATENT DOCUMENTS

DE        25 37 224  A1     2/1977
EP          3431755  A1 *   1/2019   .............. F03D 5/00
(Continued)

OTHER PUBLICATIONS

Pang, W.; Zhu, D.; Chen, M.; Xu, W.; Wang, B. A Novel Neural Network-Based Adaptive Formation Control for Cooperative Transportation of an Underwater Payload Using a Fleet of UUVs. Drones 2025, 9, 465. https://doi.org/10.3390/drones9070465 (Year: 2025).*
(Continued)

*Primary Examiner* — Ramon A. Mercado
*Assistant Examiner* — John Martin O'Malley
(74) *Attorney, Agent, or Firm* — Crowell & Moring LLP

(57) ABSTRACT

A hydrodynamic drag-modulation system for six-degrees-of-freedom (6-DoF) dynamic positioning (DP) of deep-sea payloads—including station-keeping and controlled translation of very large, submerged bodies—is introduced, wherein a distributed underwater swarm of vector-drag generating drones (tethered autonomous underwater vehicles or T-AUVs) leverages coordinated multi-agent control, independent of surface DP vessels and surface conditions. By commanding tether-retraction velocity and geometry of the drag-inducing elements, each drone agent functions as a virtual, relocatable bollard in three dimensions. Collectively, the swarm forms a virtual, dynamic dock around the payload, enabling both precision DP operations and long-range deep-sea transport missions. Furthermore, due to the non-propulsive, drag-modulation-based actuation principle, the system is inherently configurable for cavitation-free operation, thus suitable for industrial or scientific operations requiring low-acoustic-signature. By treating hydrodynamic drag as a programmable, distributed actuator, the system achieves surface-independent 6-DoF control, providing fault-tolerant, high-precision manipulation and transport under conditions where conventional DP systems fail.

22 Claims, 7 Drawing Sheets

(51) Int. Cl.
   *G05D 1/495* (2024.01)
   *G05D 109/30* (2024.01)

(56) References Cited

U.S. PATENT DOCUMENTS

| | | | | |
|---|---|---|---|---|
| 5,241,922 | A | 9/1993 | Allen | |
| 8,437,979 | B2 | 5/2013 | Frank et al. | |
| 8,777,285 | B1 | 7/2014 | Howell | |
| 8,973,901 | B2 | 3/2015 | Roodenburg et al. | |
| 9,045,947 | B2 | 6/2015 | Edwards et al. | |
| 12,233,996 | B1 * | 2/2025 | Liu | B63G 8/04 |
| 12,263,917 | B2 | 4/2025 | Newby et al. | |
| 2009/0302162 | A1 | 12/2009 | Reed et al. | |
| 2010/0282913 | A1 | 11/2010 | Mouskis | |
| 2011/0108669 | A1 | 5/2011 | Kirkland | |
| 2015/0048621 | A1 | 2/2015 | Smeenk et al. | |

FOREIGN PATENT DOCUMENTS

| | | | |
|---|---|---|---|
| WO | WO 2013/147600 | A2 | 10/2013 |
| WO | WO 2020/118385 | A1 | 6/2020 |
| WO | WO 2022/119447 | A1 | 6/2022 |

OTHER PUBLICATIONS

L. Chiang and S. Dunker, "Concept of using drogue chutes as a ship decelerator system," 2010 International WaterSide Security Conference, Carrara, Italy, 2010, pp. 1-5, doi: 10.1109/WSSC.2010. 5730233. (Year: 2010).*

* cited by examiner

DISTRIBUTED VECTOR-DRAG DRONE SWARM SYSTEM FOR DYNAMIC POSITIONING

RELATED APPLICATIONS

This application claims the benefit of U.S. Provisional Patent Application No. 63/857,759, filed Aug. 5, 2025, the entire contents of which are hereby incorporated by reference.

TECHNICAL FIELD

The present invention relates to dynamic-response hydrodynamic control systems for marine vessels and payloads. More specifically, it concerns distributed, tether-based drag modulation architectures for active counter-force generation used in dynamic positioning operations.

Keywords: dynamic positioning; vector-drag drone; underwater drone swarm; hydrodynamic drag modulation; distributed robotic positioning; submersible control; tethered autonomous underwater vehicle (T-AUV); coaxial alternating vector-drag drone; tethered agent swarm; hollow-shaft routing; axial through-passage; line-of-action colinearity; along-tether relative velocity ($F \propto v^2$); geometry-adaptive; control surfaces (flaps/vanes); winch ramp-limits; fault-tolerant swarm control; IMU+acoustic/EM/tether state estimation; 6-DoF pose control; propellerless repositioning (diaphragm/fin/vortex-ring/inchworm).

BACKGROUND

Conventional maritime platforms typically rely on lateral thrusters—such as tunnel, retractable, or azimuth thrusters—for dynamic positioning such as station-keeping, precision maneuvering, and directional control at low speeds. These propulsion-based mechanisms often require design-level integration and thus are not inherently applicable to passive payloads (e.g., floating or immersed bodies that lack onboard propulsion or attitude control, such as oil-rig manifolds and templates or prefabricated segments of submersible structures with hydro-dynamically challenging shapes) or to legacy vessels (e.g., older tankers or freighters that lack lateral thrusters). In many operational scenarios at low- or zero-velocities and under variable environmental conditions, external towing or dynamic positioning assets (e.g., tugboats or dynamic positioning (DP) surface vessels) are employed. However, these solutions are surface-dependent and become constrained in deep-sea operations by (i) surface-layer conditions (e.g., weather-driven sea states) and (ii) depth-related constraints (e.g., limited vector control/manipulability at working depth).

To the best of the applicant's knowledge, there is no commercially available self-contained subsea dynamic-positioning capability configured to couple to and maneuver passive submerged loads—i.e., to provide station-keeping, precision repositioning, or controlled translation of large, immersed bodies—independently of surface vessels. In practice, ROVs and AUVs provide inspection, metrology, and limited force assistance, while primary positioning forces are delivered from the surface. As a result, precise positioning of passive payloads in deep-sea conditions remains operationally challenging and resource-intensive. There is therefore a continuing need for self-contained, non-surface-dependent subsea positioning approaches—operable without external towing/DP assets or seabed infrastructure—that provide stabilization, precision maneuvering, and directional control for passive payloads or for vessels that become temporarily incapacitated during hazards (e.g., loss of propulsion or steering).

SUMMARY OF THE INVENTION

The disclosure relates to a dynamic-response hydrodynamic control architecture that employs the disclosed Dynamic Counter-Force Modulation within a Continuous Drag-Generation Continuum, via retraction-induced and geometry-induced drag generated by Distributed Vector-Drag-Drone Swarms, which enables coordinated locomotion based on active generation and closed-loop control of drag-induced vector counter-forces by pulling a geometry-controllable, drag-inducing body through a fluid medium, wherein drag scales approximately with the square of the relative velocity of the fluid flow along the longitudinal axis relative to the body ($F \propto v^2$) and the effective projected area of the drag-inducing structure ($F \propto A$). More specifically, the disclosed embodiments relate to a hydrodynamic drag-modulation architecture for six-degrees-of-freedom (6-DoF) dynamic positioning (DP) of marine payloads, including station-keeping and controlled translation of very large, submerged bodies, wherein a distributed underwater swarm of vector-drag-generating drones (tethered autonomous underwater vehicles or T-AUVs) leverages coordinated multi-agent control, independent of surface DP vessels and surface conditions.

Namely 'Distributed Vector-Drag Drone Swarm' (DVDDS) is a multi-agent system in which each agent includes a geometry-adaptive drag-inducing structure, e.g., a retractable canopy, and is tethered to a traction-generating device, e.g., a winch, coupled to the payload, and is capable of positioning itself spatially during both (i) an active, drag-inducing phase, e.g., by manipulating the geometry of the surface of the drag-inducing structure while being pulled by the winch, and (ii) a passive repositioning phase, e.g., by adjusting a cluster of deflector flaps during cruising by its own propulsion system. By commanding tether-retraction velocity and geometry of the drag-inducing elements, each drone agent functions as a virtual, relocatable bollard in three dimensions. Collectively, the swarm forms a virtual, dynamic dock around the payload, enabling both precision DP operations and long-range deep-sea transport missions. More precisely, the system enables real-time modulation of hydrodynamic drag vectors by coordinating tether tension, agent positioning, and surface geometry—exploiting the velocity-squared dependency of drag to deliver precise, scalable, and responsive manipulation within a continuum, across diverse marine applications.

In addition, due to the non-propulsive, drag-modulation-based actuation principle, the system is inherently configurable for cavitation-free operation, thus suitable for industrial, scientific or military operations requiring low-acoustic-signature. Distributed Vector-Drag Drone Swarm (DVDDS) systems, therefore, exhibit foundational potential in marine robotics, particularly for deep-sea dynamic positioning (DP) of marine payloads—including station-keeping, precision repositioning, or controlled translation of very large, submerged bodies—in a wide range of applications. By reframing hydrodynamic drag as a precise, programmable, distributed actuator, the DVDDS architecture achieves surface-independent six-degrees-of-freedom (6-DoF) control, providing high-precision, fault-tolerant, low-acoustic-signature manipulation and transport of deep-sea payloads—or even deep-sea vehicles, as an auxiliary actuation layer—under conditions where conventional DP systems fail.

DETAILED DESCRIPTION

Figure 1:
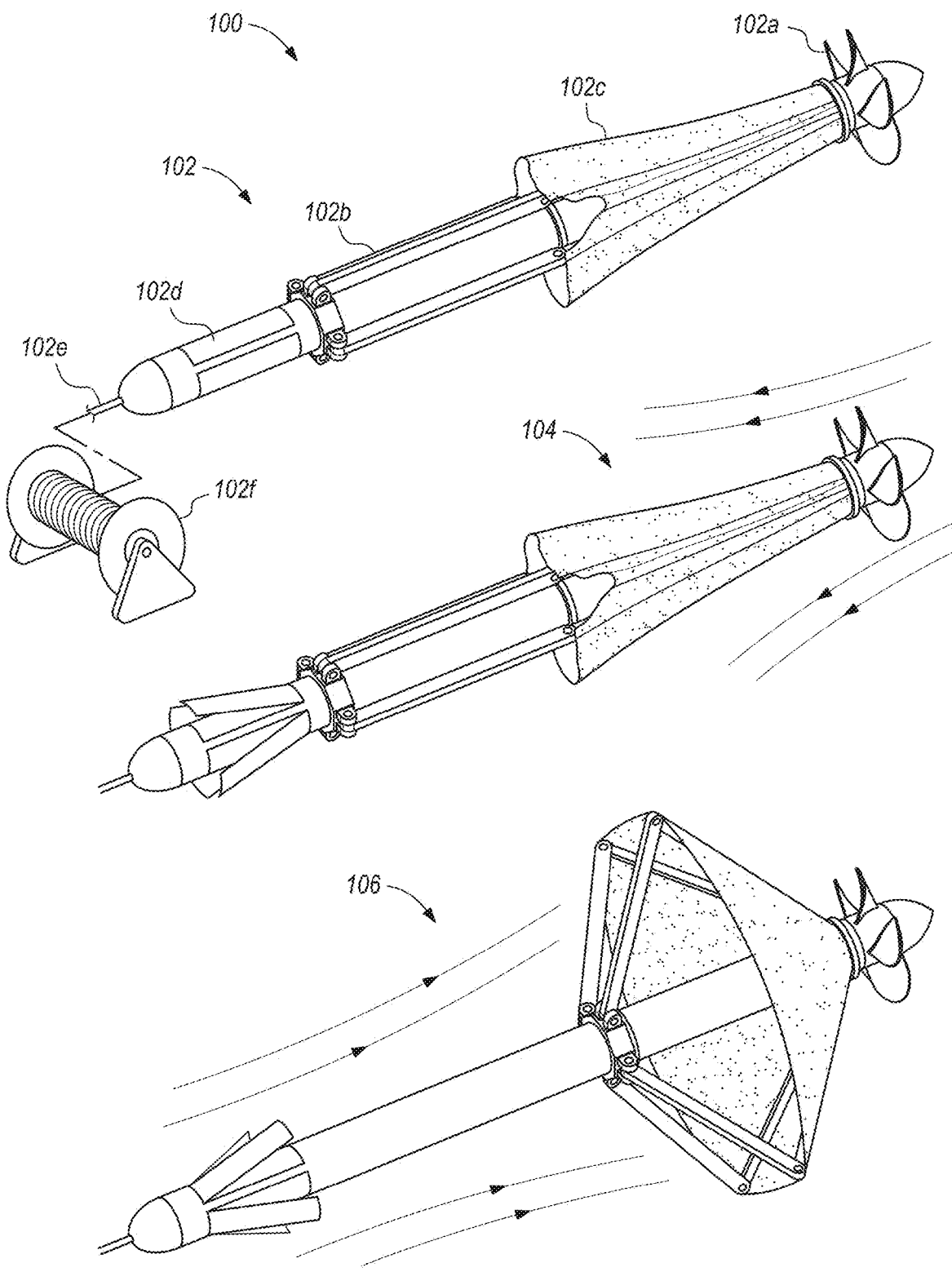
FIG. 1 illustrates a mono-module single-winch vector-drag drone (MMSVDD) agent.
Figure 2:
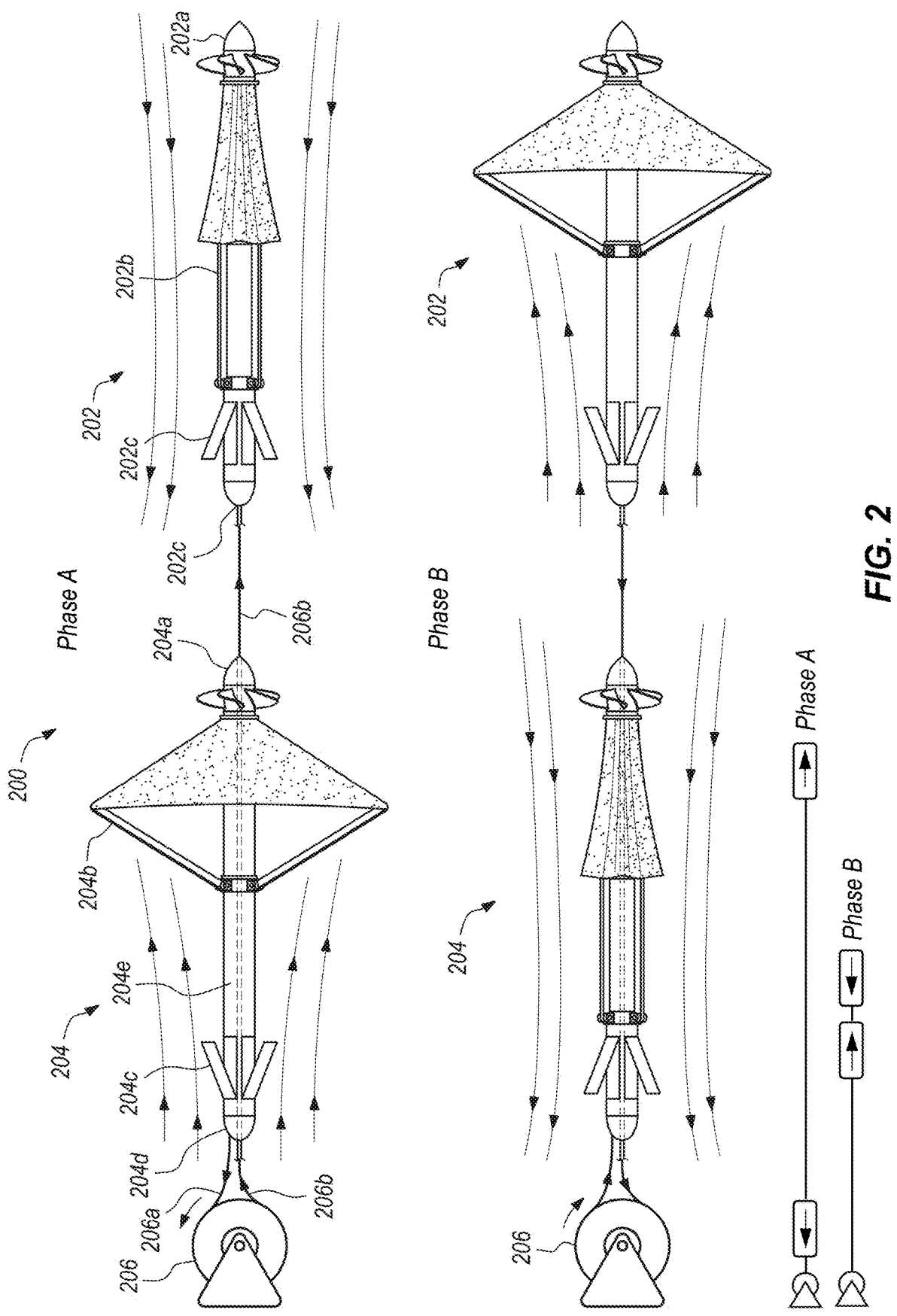
FIG. 2 illustrates a dual-module single-winch, coaxial alternating vector-drag drone (DMSVDD) agent.

S1.0) Dynamic Counter-Force Modulation Via Distributed Vector-Drag Drone Swarms (DVDDS):

The embodiments define the governing formulation for Dynamic Counter-Force Modulation via Distributed Vector Drag Drone Swarms (DVDDS), as implemented through a continuous drag-generation architecture that coordinates retraction- and geometry-induced vector drag across tethered autonomous agents to deliver programmable, $v^2$-scaled counter-forces for dynamic positioning—e.g., station-keeping or controlled translation of marine payloads—in deep-sea environments. In order to achieve continuum, the system employs coordinated multi-agent orchestration, wherein distinct structural units alternate between drag-inducing and repositioning phases—analogous to a gaited locomotion pattern—thereby ensuring uninterrupted hydrodynamic actuation. This temporal decoupling of drag phases—termed phased orchestration—allows drone agents to maintain uninterrupted actuation even under chaotic flow conditions or variable tether dynamics. By distributing the counter-force generation cycle across spatially separated units, the system enhances overall stability, fault tolerance, and responsiveness during precision-critical underwater operations. FIGS. 1 & 2, illustrate two example vector-drag drone agent types, while 3, 4, and 5 illustrate their application through representative structures for dynamic counter-force modulation within a continuous drag-generation continuum, via retraction- and geometry-induced vector-drag through coordinated vector-drag drone swarms.

S1.1) Vector-Drag Drone Agents (VDD):

According to the embodiments, a vector-drag drone module is a torpedo shaped rigid body that is tethered to a pulling device (e.g., a winch coupled to a payload or host vessel), comprising a deployable drag-inducing structure (e.g., a canopy covered telescopic frame with adjustable telescopic arms) for counter-force generation, adjustable deflector flaps (e.g., piston driven bi-directional ailerons) for steering and local drag trimming, an onboard thruster (e.g., an electrically driven propeller) for cruise/positioning during passive phases, an IMU and tension/pressure sensing, and a local controller. Power and command may be provided through the tether; telemetry and safety interlocks may be maintained with the host. During operation, the host-vessel- or payload-mounted winch modulates tether retraction velocity to set the primary drag magnitude, while the drone trims attitude and effective area via flap actuation and deployment radius adjustment. Modes include (i) cruise/positioning, (ii) deploy, (iii) active retraction for drag generation, and (iv) reset/redeploy, with fail-safe recovery if tension or attitude limits are exceeded. Variants include geometry-adaptive canopies capable of asymmetric shaping, flap-only steering, and propellerless, low-acoustic-signature generating versions. By eliminating heavy onboard propulsion and steering components (e.g., motor, propeller, steering devices, etc.) that induce significant mass and complexity into the system, DVDDS drones remain radically lightweight, maneuverable, and highly responsive under various dynamic underwater conditions including near zero velocity conditions where especially station-keeping operations take place. Note: "payload-mounted winch" denotes the winch mechanically coupled to the payload or vessel; "winch" refers to the payload-mounted winch unless stated otherwise.

Mono-Module Single-Winch Vector-Drag Drone (MMSVDD): FIG. 1 illustrates a mono-module single-winch vector-drag drone (102) with a geometry-adaptive canopy (102c) and an adjustable telescopic frame (102b) as the drag-inducing structure for active counter-force generation during winch pull, an onboard electric-motor-driven propeller (102a) for positioning during winch release, mode-adaptable adjustable deflector flaps (102d) for steering in both active force-generation and passive positioning modes, and a tether (102e) connected to a payload-mounted winch (102f). 104 is the drone module in passive positioning mode where the propeller is active, adjustable deflector flaps are trimmed to the local flow, and the drag-inducing canopy is fully stowed. The flaps are bidirectional in function, providing authority in both pull and reposition phases. 106 is the winch-retracted drone in active force-generation mode with the geometry-adaptive canopy deployed and the flaps set to vector the resultant drag. Adjustable deflector flaps provide directional control by inducing asymmetric flow, while the deployment arms regulate drag magnitude via the arm angle ($\theta$). Each flap contributes direct flow redirection—similar to an aileron—and indirect drag trimming by reducing local fluid load on the canopy, enabling precise attitude manipulation via differential hydrodynamic torque and each deployment arm may be adjusted independently to manipulate canopy geometry and generate asymmetric counter-force. In this configuration, at least two mono-module single-winch vector-drag drones (MMSVDD-A and MMSVDD-B) operate in a gated alternation, where A is in an active pull phase generating counter-force, while B is in a passive repositioning phase, and vice versa. The controller schedules the alternation so that tether tension remains continuous and delivered traction is substantially uninterrupted.

Dual-Module Single-Winch, Coaxial Alternating Vector-Drag Drone (DMSVDD): FIG. 2 illustrates a dual-module single-winch, coaxial alternating vector-drag drone (200). A secondary hollow-shaft module (204) is arranged coaxially behind a primary module (202) such that the tether of 202 (206b) is routed through an axial passage (204a, 204e, and 204d) of 204, where 204a is a hollow-shaft motor and propeller. The single winch (206) alternately retracts one tether while proportionally paying out the other, producing cyclic traction with at least one drag-inducing structure (202b or 204b) continuously exposed to the flow. The coaxial routing maintains a line-of-action substantially collinear with the system axis, thereby minimizing yawing moments and tether interference during hand-off and providing a symmetric, continuous vector-drag output. The upper panel depicts Phase A, where the winch pulls the module 204 by the tether 206*a*—which generates active counter-force while modulating the vector direction and drag intensity via the flaps 204*c* and telescopic arms 204*b*, respectively—while simultaneously releasing the module 202, which positions itself via the flaps 202*c* and the motor-driven propeller 202*a*, while maintaining continuous tension on the tether 206*b*. Once 204 approaches the winch 206 within a proximity threshold, phase A shifts to phase B (as depicted in the lower panel) where the module 202 becomes the active drag-generating module and the module 204 becomes the passive positioning module until the modules meet within a proximity threshold, at which point phase B shifts back to phase A. Vector positioning—on the other hand—is mainly performed by the active force-generating module, while the passive positioning module adjusts its attitude according to the change in the attitude of the active module—for example by controlling flap angles and propeller rotation accordingly—to maintain linear alignment with its counterpart. At both phases, including the transitions, modules 202 and 204 are synchronized such that $|v_A| \approx |v_B|$ for both pulling and releasing velocities. The system delivers continuous vector-drag except for a brief hand-off interval during transition. The hand-off intervals are shown at the bottom-left legend, where the upper diagram corresponds to the very late-stage (almost the end) of phase A, and the lower diagram to the very late-stage (almost the end) of phase B—drawn to the same scale.

Additional Notes: (1) To adjust the maximum operational separation distance ($\Delta L_{max}$) between the modules 202 and 204—and to fully retract and stow the tethers during non-operational periods—the DMSVDD may include an internal tether-buffer within the winch assembly (e.g., a secondary storage/buffer drum). This buffer may accommodate excess line without altering the synchronized, equal-magnitude pull and pay-out velocities described above. (2) As used herein, "control surfaces" encompass any structures that modulate hydrodynamic drag magnitude and/or direction by changing effective projected area, flow deflection, or geometry asymmetry, including but not limited to flaps, vanes, tabs, movable fairings, variable-porosity panels, or functionally equivalent mechanisms. (3) The DMSVDD architecture may be extended to three (or more) modules scheduled in a triphasic (or multiphasic) cycle, wherein an additional module remains load-bearing during the hand-off interval to bridge the counter-force gap. (4) To fully eliminate the hand-off transient (counter-force trough) without altering the DMSVDD architecture, the winch may be equipped with an auxiliary retraction system that—additionally—pulls both of the modules (via the tethers 206*a* and 206*b*) in sync during hand-offs. In this configuration, during the hand-off interval, the whole system is additionally pulled by a secondary retraction system (e.g., a piston-based mechanism that pulls both tethers 206*a* and 206*b* through the corresponding pulleys located near the winch port, without interfering with the main operation), thus bridging the counter-force gap.

S1.2) Distributed Vector-Drag Drone Swarm System (DVDDS):

Distributed Vector-Drag Drone Swarms (DVDDS) are dynamic positioning systems that enable precise stabilization or maneuvering of submerged marine structures, e.g., pipeline components such as subsea manifolds and templates, compliant towers, underwater tunnels, dive bells, etc., wherein multiple vector-drag drone agents operate cooperatively as a decentralized counter-force network, such as for subsea installation, or heavy lifting operations. In various embodiments, each drone of the swarm is equipped with (i) an individual winch system for tether-based pulling; (ii) geometry-adaptive drag-modulating surfaces; (iii) an onboard thruster for positioning; and (iv) ruddering components for enabling precise vector control of hydrodynamic force—as illustrated in FIGS. 1, and 2—and altogether form a distributed intelligent network, capable of inter-drone communication via electromagnetic, acoustic, or tether-transmitted signaling, depending on operational constraints. Control coordination is executed either centrally or through swarm logic to achieve global objectives such as position hold, orientation correction, or coordinated trajectory tracking. Essentially, the system is fail-safe by design, i.e., if one or more drones become inoperable, the remaining agents can adjust their force vectors and continue the operation through asymmetric counter-force generation, according to the embodiments.

Figure 3:
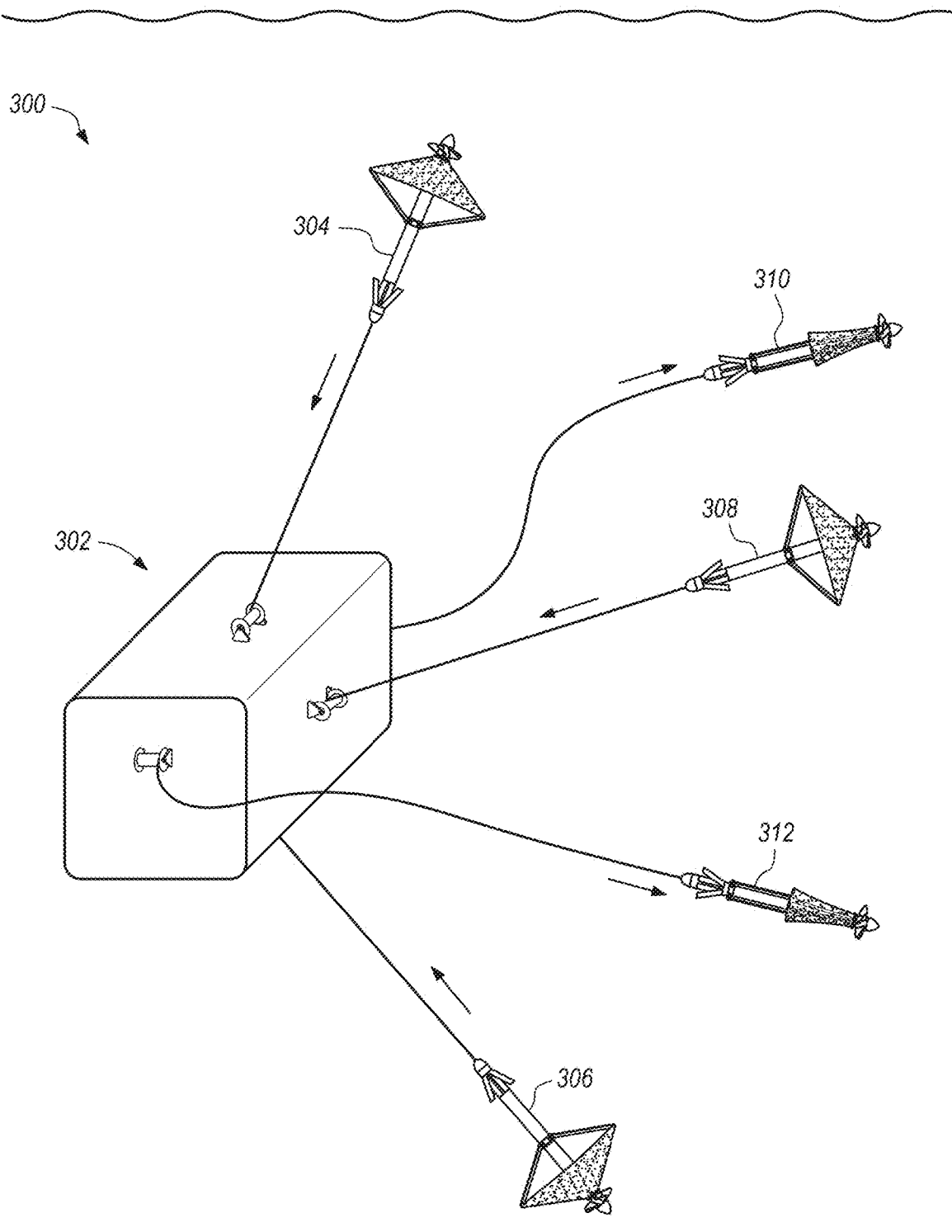
FIG. 3 demonstrates a distributed drag swarm deployment structure based on multiple MMSVDD type agents.

FIG. 3 demonstrates a distributed drag swarm deployment structure (300) upon a non-propelled, monolithic cubical body (302), e.g., a pipeline manifold and template, to provide full six-degrees-of-freedom (6-DoF) control for subsea installation where each of the multiple tethered MMSVDD type agents (304, 306, 308, 310, and 312) operate from a central winch module aligned along a distinct axis or plane (e.g., ±X, ±Y, ±Z). These winch units are remotely actuated to pull the drones along varying vectors and tensions, thereby generating directional forces or torques on the central payload. To enhance controllability and responsiveness, each agent dynamically modulates its drag profile during operation by adjusting its effective deployment radius $r_{deploy}$ through retractable or extendable control surfaces actuated by pneumatic or electromechanical means. This geometry-adaptive drag modulation works in tandem with winch-induced counter-force to produce compound stabilization or maneuvering effects. As depicted in FIG. 3, each agent undergoes a sequence of active force-generating (304, 306 and 308) and passive positioning (310 and 312) states. The figure highlights the decentralized drag generation scheme, showing how each winch-driven agent contributes to the net counter-force through coordinated pulling and flap actuation, all powered and signaled through centralized towing cables.

Figure 4:
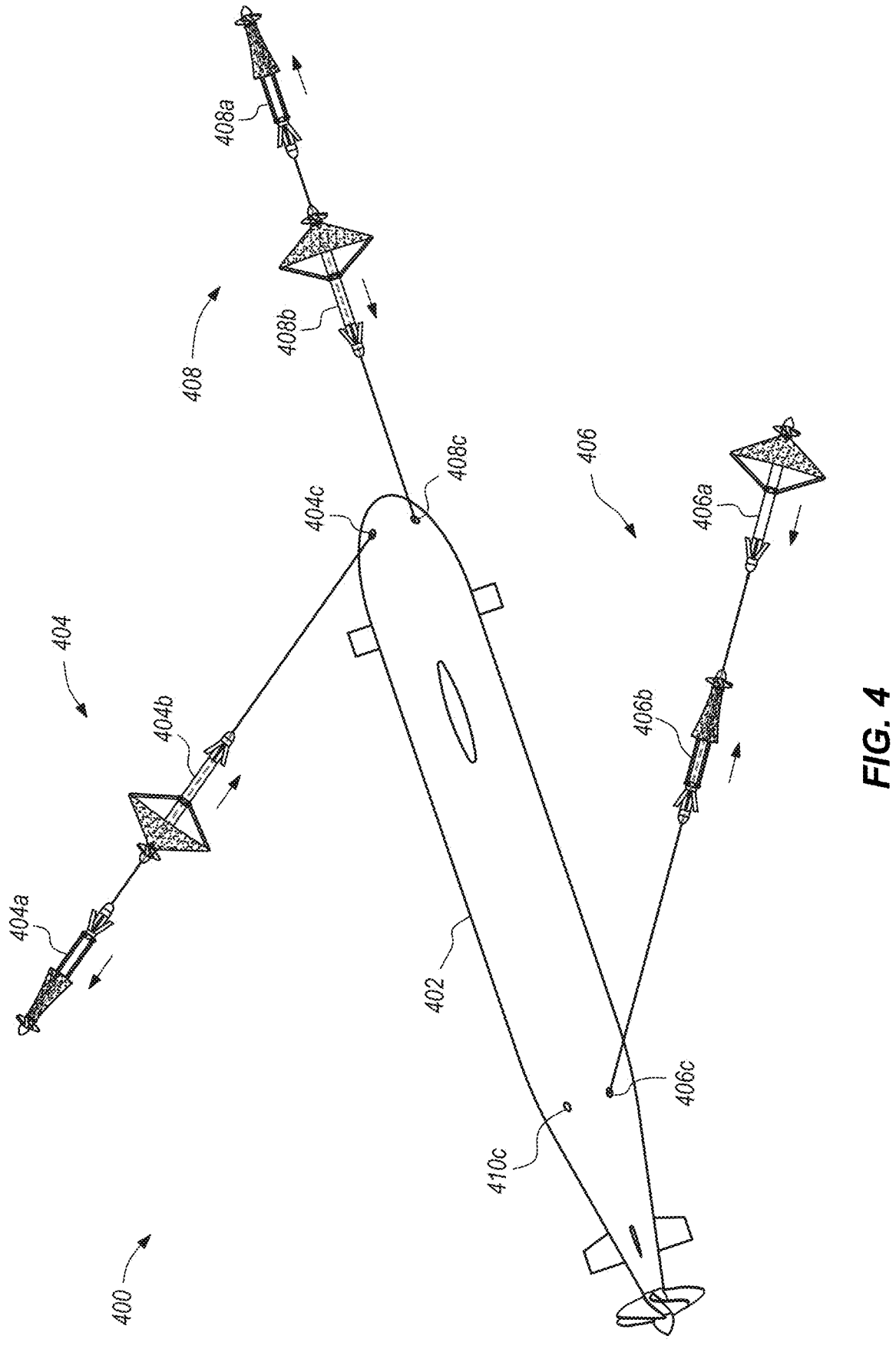
FIG. 4 illustrates an underwater XYZ operation in which a host underwater vehicle integrates multiple DMSVDD-type agents for precise pose control.

FIG. 4 illustrates an underwater XYZ operation in which a host underwater vehicle (402) integrates multiple vector-drag agents for precise pose control. Three dual-module, single-winch, coaxial alternating vector-drag drones (DMSVDDs) are deployed externally (404, 406, and 408), while a fourth DMSVDD agent remains stowed within a launch tube (406*c*) ready for fail-over or surge demand. In each DMSVDD, a positioning module and an active pull module alternate in a gated cycle while the drone's—single—winch retracts one tether and proportionally pays out the other, maintaining substantially continuous traction along a line-of-action that is substantially colinear with the common longitudinal axis and, therefore, suppressing yaw moments during hand-off and mitigating the risk of tether entanglement. During the passive positioning phase, a DMSVDD module uses its propeller, when present, or a propellerless repositioning mechanism, and bidirectional flaps for thrust and steering (404*a*, 406*b*, 408*a*); and during the active counter-force generation phase, said module uses its geometry-adaptive canopy and bidirectional flaps for vector counter-force generation (404*b*, 406*a*, 408*b*). The controller schedules the DMSVDDs out of phase so that when one DMSVDD traverses its brief hand-off interval (e.g., deceleration from pull and re-acceleration to the next pull over ~1.5 s+~1.5 s), the other DMSVDDs are in an active pull phase, preserving a substantially uninterrupted net counter-force. Together, the agents provide quiet, hull-thruster-free 6-DoF alignment of the underwater vehicle under external loads and in disturbance-rich conditions.

Figure 5:
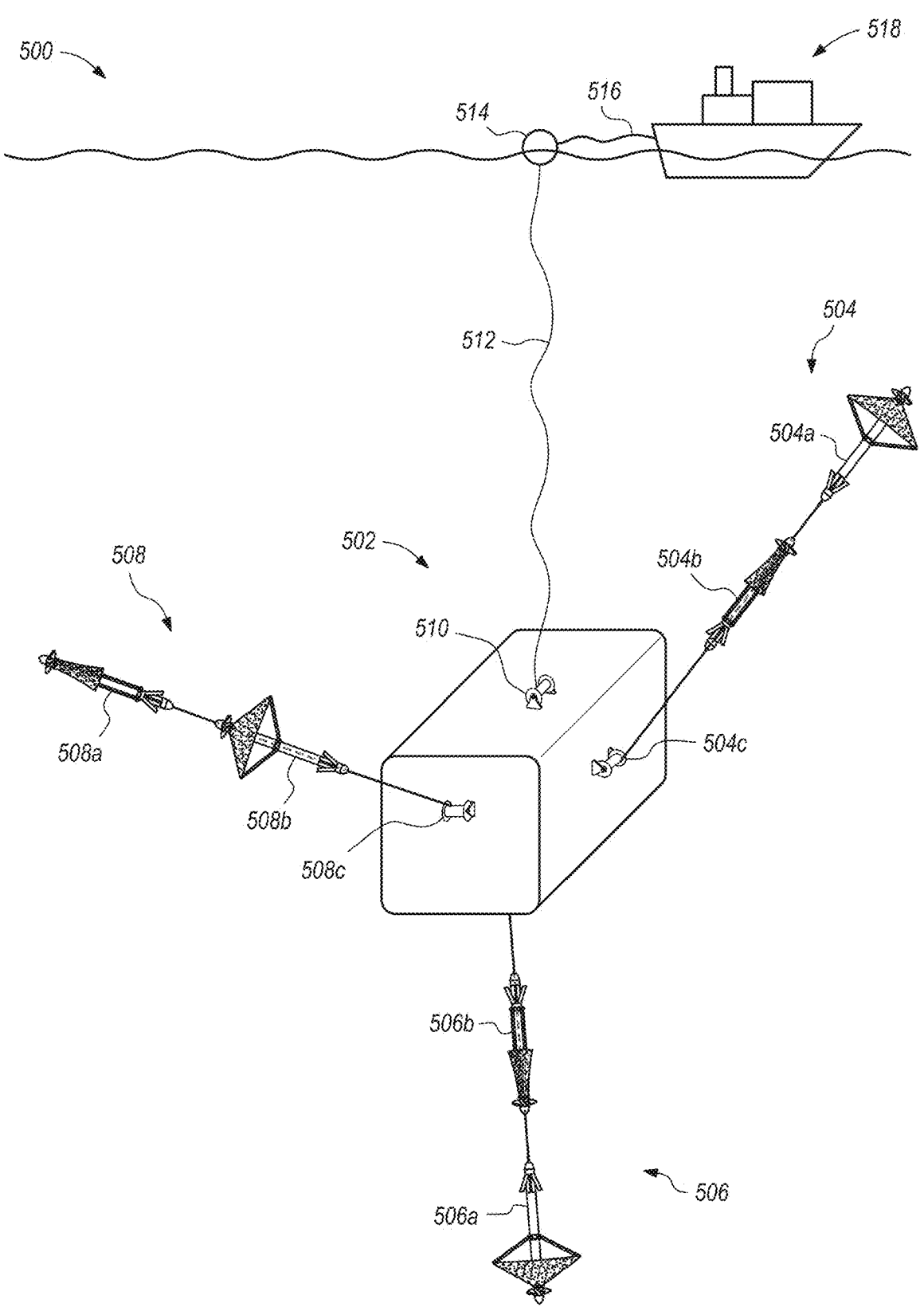
FIG. 5 depicts a surface "Power-Bank" recharging vessel servicing a submerged distributed vector-drag drone swarm (DVDDS) around a cuboidal payload.

FIG. 5 depicts a DMSVDD-type distributed drag swarm deployment arrangement (504, 506, 508) on a non-pro-pelled, monolithic cubical body (502), e.g., a pipeline mani-fold and template, to provide full six-degrees-of-freedom (6-DoF) control for subsea transport and installation. The modules 504a, 506b and 508a are shown during the passive positioning phase, while 504a, 506b and 508a are shown during the active counter-force generating phase, where each is tethered to its winch module that is coupled to the payload 502 respectively (504c, 506c, 508c). Unlike a mono-module single-winch vector-drag drone (MMSVDD) swarm con-figuration (as shown in FIG. 3), the DMSVDD-type swarm configuration does not need to incorporate a gaited locomo-tion pattern. In DMSVDD swarms, each drone generates substantially continuous counter-force, with its modules maintained substantially colinear and the tethers maintained in tension. Thus, this configuration behaves similarly to a propulsion-based drone swarm configuration while retaining all other advantages of the architecture, such as providing high levels of programmable vector-thrust at near zero payload speeds. FIG. 5 further depicts a rendezvous with a surface vessel (518), connected via the cables 512 and 516 through the buoy 514, where the buoy 514 being connected to the winch 510 that is coupled to the payload 502. The rendezvous may take place while the vessels are at rest or underway, the buoy providing a compliant surface link while the DVDDS maintains six-degree-of-freedom pose of the payload during—for example—power or fluid transfer.

S1.3) Mechanical Properties of Vector-Drag Drone (VDD) Agents:

Convention: Unless stated otherwise, $v_{rel}$ denotes the component of the deployed drag body's velocity relative to the local surrounding fluid along the tether line-of-action. For compactness, the formulations herein neglect ambient-flow terms (i.e., assume locally still or uniform water), so $v_{rel}$ reduces to the sum of the commanded pulling velocity and the payload's velocity component along the tether (i.e., $v_{rel}=v_{pull}+v_{payload}$). Where ambient currents are material, the general case is obtained by adding the local ambient-flow component along the tether to $v_{rel}$; no other changes to the control or force expressions are required.

Retraction-Induced Drag: Let $v_{payload}$, velocity of the payload relative to water; $v_{pull}$; retraction (pulling) velocity of the tether by the winch relative to payload; $\rho$, fluid density; A, effective projected area of the drag-inducing structure; and $C_D$, drag coefficient—for clarity of exposition, within each active-pull or passive-drift sub-phase the canopy geometry is treated as fixed, i.e., A and $C_D$ are held constant over the sub-phase. Then, total drag force or counter force generated is $F_{drag,total}=F_{drag,pull}+F_{drag,drift}$, where the iso-lated active pulling drag-due to further resistance induced by active winch pulling—is $$F_{drag,pull} = \frac{1}{2} \cdot \rho \cdot A \cdot C_D \cdot \left[ (v_{pull} + v_{payload})^2 - v_{payload}^2 \right],$$

and passive drag—due to resistance while drag-inducing structure is extended but not being actively pulled—is $$F_{drag,drift} = \frac{1}{2} \cdot \rho \cdot A \cdot C_D, \cdot v_{payload}^2.$$

Thus, via controlling the pulling velocity, a proportional counter force $F_{drag,total}$ that is proportional to $$v_{pull}^2$$

can be induced and the combined force, $F_{drag,total}$ ($v_{pull}$, $v_{payload}$), may be used for stabilization, dynamic braking, or momentum vector control of marine vessels/payloads. Note: Geometry modulation A(t), $C_D$(t) used for drag-intensity scaling and vectoring is described separately and is not limited by this derivation. In the general case, when geom-etry is modulated, the instantaneous force is $F_{drag}$(t)=

$$\frac{1}{2} \cdot \rho \cdot A(t) \cdot C_D(t) \cdot v_{rel}^2(t)$$

with $v_{rel}$(t)=$v_{pull}$(t)+$v_{payload}$(t); asymmetric geometry intro-duces a small vectoring angle $\delta$, yielding an axial component $F_{\parallel}=F_{drag} \cos \delta$ for traction and a lateral component $F_{\perp}=F_{drag} \sin \delta$ for attitude torque.

Geometry-Induced Drag: (i) Intensity Scaling: Modula-tion of drag intensity is enabled via manipulating the geom-etry of drag-inducing structure—e.g., altering the canopy geometry via controlling its deployment radius $r_{deploy}$. More concretely, assuming that $C_D$=0 when $r_{deploy}$=0, total drag control function becomes a function of $v_{pull}$ and $r_{deploy}$, i.e. $F_{drag,total}$ ($v_{pull}$, $r_{deploy}$), thereby rendering the payload veloc-ity an independent or decoupled parameter in the control loop. (ii) Steering: Attitude control is enabled via adjustable deflector flaps that induce asymmetric flow to generate differential hydrodynamic torque. In this regard, each flap may contribute both direct flow redirection—similar to an aileron—and indirect drag reduction by decreasing local fluid impact on the drag-inducing structure, thus enabling precise attitude manipulation via differential hydrodynamic torque. Alternatively, or in addition, the geometry of the drag-inducing structure may be altered asymmetrically by individually controlling the deployment length and/or the angle of the telescopic arms to generate asymmetric direc-tional drag. During the repositioning phase (canopy closed), flap deflection is inverted with the local flow. For example, a dual-acting piston/linkage (or paired micro-actuators) drives either edge upward so the canopy-side edge holds neutral while the tether-side edge rises, preserving steering/tension in both pull and release phases, thus enables bidi-rectional flap actuation.

S1.4) Traction Force Generation Potential of Vector-Drag Drone (VDD) Agents and Thrust-to-Weight-Ratio:

Traction Force Generation Potential: A vector-drag agent equipped with a 2-meter diameter canopy—or a similar drag-inducing structure—can generate substantial counter-force using velocity-induced drag. The drag force $F_{drag}$ IS calculated using the drag equation:

$$F_{drag} = \frac{1}{2} \cdot \rho \cdot A \cdot C_D \cdot v_{pull}^2,$$

where $\rho$=1025 kg/m3 (typical seawater density), $C_D \approx$1.2 for a parachute like semi-spherical canopy. For tether retraction velocities ($v_{pull}$) of 5 m/s, 10 m/s, and 15 m/s, the system produces approximately 48 kN, 193 kN, and 434 kN of force, respectively. In comparison, commercial 2-meter diameter bow thrusters typically deliver 150-170 kN (single-propeller) or 190-220 kN (dual contra-rotating) of thrust under real conditions. For azimuth (steerable) thrusters in the ~2 m propeller class, examples include: Wärtsilä WST-14 (prop Ø1.8-2.0 m) rated 39-46 t bollard pull for a pair (≈19.5-23 t per unit≈191-226 kN), and Schottel SRP 360 (prop Ø2.0 m) used on tugs achieving ~35 t bollard pull with two units (~17.5 t per unit≈172 kN, vessel-dependent). This indicates that a vector-drag drone can match or exceed longitudinal thrusters at modest retraction velocities (e.g., 10 m/s), and deliver double the force at higher retraction velocities (e.g., 15 m/s) including ranges that match or surpass azimuth-class steerable thrusters used as primary propulsion.

Thrust-to-Weight-Ratio (Gensets/Batteries Excluded): For a 193 kN vector-drag channel, two design points are illustrative. (A) With a Ø2 m canopy at 10 m/s, the mechanical requirement is ~1.93 MW (since P=Fv); including a ~2 MW motor (~7.2 t), 200 kN winch (~0.64 t), 1000 m HMPE tether (~0.20 t), and agent+structure (~0.45 t), the total installed mass is ~8.5t, giving T/W≈2.3 and ~23 kN/t. (B) If the canopy is enlarged to Ø≈3.9 m and line (pulling) velocity reduced to ≈5.2 m/s, the same 193 kN is achieved with ≈1.0 MW; using a ~1 MW motor (~5.5 t) and agent+structure (~0.90t—due to larger canopy) the total installed mass is ≈7t, giving T/W≈2.8 and ~28 kN/t. For context, a ~2 m azimuth thruster delivering comparable ~190-220 kN typically totals ~16.5-18.5t including its ~1 MW drive motor (but excluding gensets), corresponding to T/W≈1.2-1.1. Accordingly, the Option B vector-drag configuration (Ø≈3.9 m canopy, 1 MW motor) delivers ~193-200 kN at T/W≈2.8, versus T/W≈1.2 for a comparable ~2 m azimuth thruster—i.e., about 2× higher T/W under the same accounting (motors included; gensets/batteries excluded). Note: Increasing winch drum radius raises torque and lowers angular velocity, but P=τω=Fv remains unchanged; thus, for a given target pull velocity and tether force, the mechanical power requirement is invariant to drum radius.

S1.5) Hull-Agnostic Integration and Scalability of Vector-Drag Drone (VDD) Agents:

Hull-Agnostic Integration & Flow-Corridor Independence: DVDDS can be integrated at almost any point on a hull or passive payload because actuation is applied remotely via tether tension rather than by expelling jets at the mounting location. Unlike thruster-based solutions—including azimuth units—which require clear inflow/out-flow corridors, optimized hull cut-outs, and local structural reinforcement, a vector-drag agent's line-of-action is set by where the tether is led and where the agent stands off in the water column. This flow-corridor independence enables installations in confined geometries, behind appendages, or on complex structures where providing clean water to a propulsor is impractical. It also allows designers to place attachment points to maximize moment arms for yaw/pitch/roll control without relocating heavy machinery. Practically, a winch can be mounted wherever structure is available, and an agent can be deployed from any convenient location, because the water-jet pathway near the hull is not a constraint—only the tether routing and standoff geometry govern performance.

Scalability: Vector-drag agent-winch configuration is mechanically simpler than thruster-based systems, which supports scalability. A drag-drone is a compact, torpedo-shaped body carrying steering flaps for attitude trim and an adjustable telescopic frame supporting a high-strength fabric canopy; the body connects via a neutral-buoyancy, high-strength tether to an electric winch. Repositioning propulsion—when present—is used only intermittently (not for traction). The architecture omits precisely balanced propellers, gear trains, and ducted nozzles at the payload, reducing integration and maintenance burden while enabling scale-out by replicating agents and/or increasing canopy size.

S1.6) Comparison of Vector-Drag Drone (VDD) Agents with Azimuth (Steerable) Thrusters in Dynamic Positioning Context:

Remote Vectoring vs. Azimuth Jets: Unlike azimuth thrusters—which vector thrust by rotating a heavy, hull-mounted propulsor and therefore inject high-shear jets into the near-field flow around the vessel or payload—DVDDS applies force remotely through tether tension generated by velocity-squared drag at a standoff location. This decouples the force line-of-action from the hull, provides longer moment arms for yaw/pitch/roll control, and avoids hull/jet interaction losses and sensor wash that degrade DP performance. Force magnitude in DVDDS maps monotonically and predictably to commanded pulling velocity and geometry modulation (e.g., flap angle, canopy deployment radius), yielding near-linear small-signal behavior and low latency near the operating point; azimuth systems exhibit dead-band and ramp limits tied to rotor inertia, cavitation avoidance, and jet establishment. Because most actuation mass in DVDDS can be centralized (winch/motor) while the drag agent is light, the architecture scales by replicating agents rather than adding multiple heavy thrusters, and maintains a low-disturbance, acoustically quiet environment at the payload for fused IMU+acoustic/EM/tether estimation.

Swarm Actuation with Persistent Counter-Force: In swarm configuration, DVDDS projects actuation into the water column via multiple tethered agents whose lines-of-action are placed where most effective. By commanding pulling velocity and geometry-adaptive drag (e.g., flaps and deployment radius), each agent functions as a virtual, relocatable bollard. Collectively, the swarm forms a virtual dynamic dock around the payload: agents apply dynamic positional tension along their tethers while others reposition, so at least one $v^2$-scaled counter-force is always available in the desired direction for error correction. This geometry provides leveraged torque arms for attitude control without high-energy jets, reduces near-field flow disturbance and acoustic interference at the payload, and—combined with fused IMU+acoustic/EM/tether estimation—maintains a 6-DoF pose within a controller-specified tolerance band under varying currents and disturbances.

Control-to-Force Mapping and Small-Signal Linearity: In thruster-based dynamic positioning, the control input is shaft angular velocity and the delivered thrust is commonly modeled as $T \approx \rho D^4 C_T(J)n^2$, where D is propeller diameter, n is revolutions per second, and C varies with advance ratio $J=V_d/(nD)$. Near zero speed and in the presence of hull inflow/recirculation, this dependence introduces nonlinearities, dead-zones, and cavitation-limited ramp rates, complicating tight pose control. By contrast, the disclosed DVDDS commands pulling velocity and drag geometry so that counter-force follows $$F = \frac{1}{2} \cdot \rho \cdot A \cdot C_D \cdot v_{rel}^2,$$

$v_{rel}=v_{pull}+v_{flow}$, yielding a predictable, monotonic mapping from control inputs to force. Around an operating point $v_0$, small changes satisfy $\Delta F \approx \rho C_D \Delta v_0 \Delta v$, providing near-linear small-signal behavior. A second, independent input-geometry modulation (e.g., flaps and deployment radius $r_{deploy}$)—adjust A and effective $C_D$, decoupling force amplitude from force direction and enabling fine vectoring without jet-induced coupling between surge, sway, and yaw.

Latency, Bandwidth, and Near-Field Disturbance: Thrusters exhibit response latency set by rotor inertia, motor/engine torque limits, cavitation-avoidance ramps, and the time for a high-shear jet to establish and interact with the hull, which also injects unsteady pressure and bubbles that degrade sonar and other aiding sensors. In the DVDDS architecture, force steps track winch-velocity steps (subject to spool acceleration and tether compliance) and rapid geometry actuators, with no local jet development at the payload. Because the drag body is remote, turbulence is largely exported to the agent's flow field; the payload sees quiet, colinear tether forces, improving pose observability and controller stability. With gaited persistence across multiple agents, at least one agent supplies counter-force at all times, reducing effective latency and enabling tight 6-DoF tolerance bands under disturbances.

Conclusion-Operational Advantages over Azimuth Thrusters: In the disclosed DVDDS architecture, counter-force (thrust substitute) is generated remotely via tether tension and geometry-adaptive drag, so the line-of-action can be placed off-hull and oriented arbitrarily in 3D. Practically, this yields (i) true XYZ vectoring with long effective moment arms for 6-DoF control, whereas azimuth thrusters primarily vector thrust in the XY plane and couple moments through short hull arms; (ii) low-disturbance operation at the payload-no high-shear jets or blade-tip cavitation near hull sensors-because turbulence is exported to the drone's flow field; (iii) fast, near-linear force mapping to commanded winch velocity and canopy geometry (drag∝v²) with minimal spool-up latency compared to rotor inertia and jet-establishment transients in azimuth units; (iv) strong low-velocity authority—large counter-forces are available even when the payload's own velocity is near zero—while azimuth thrusters are least efficient at low rpm; and (v) modularity and mass efficiency, since lightweight drones and winches scale by replication instead of adding multiple heavy rotary units. Propellerless repositioning drone variants further enable cavitation-free modes for low-acoustic-signature. Collectively, these attributes make DVDDS especially suitable for precision positioning and station-keeping of neutrally buoyant or submerged loads in disturbance-rich, deep-sea environments where conventional azimuth thrusters impose acoustic, integration, and maintenance penalties.

S1.7) Comparison of a ~200 kN Static Thrust Vector-Drag Drone (DMSVDD) with a Projected Conventional Prop-Based Underwater Drone:

Selected/Calculated Parameters: Sizing from momentum theory gives the induced-velocity $$v_i = \sqrt{T/2\rho A},$$

where T is thrust and ρ is the seawater density≈1.025 kg/m³. For a Ø2.0 m ducted prop (A≈3.14 m²), $v_i$≈5.6 m/s, and ideal power P=T$v_i$≈1.12 MW; allowing 60-70% propulsive efficiency plus ~90% electric drive efficiency implies electrical input ~1.7-2.1 MW. For a 2.5 m prop (A≈4.91 m²), $v_i$≈4.5 m/s and ideal power≈0.89 MW; with the same efficiencies the electrical input is ~1.3-1.6 MW. A practical free-swimming, neutrally buoyant drone around these props would package: (i) a pressure-tolerant 1.5-2.0 MW direct-drive PM motor (~5-7t wet, including cooling and inverter enclosure), (ii) duct/nozzle+hub/blades (~2-3t for a Kort-type shroud), (iii) structural frame & fairings with skegs and control surfaces (~3-5t), and (iv) sensors/umbilical hardware/foam (~0.5-1.0 t), yielding a mobile-module mass of roughly 12-16t (prop Ø2.0 m) and 13-17t (prop Ø2.5 m). Envelope would be a nozzle OD matching prop diameter (2.0-2.5 m) with an overall length ~8-11 m (motor+nozzle+fairing), and beam ~2.6-3.1 m.

Comparison (Mobile Modules Only): A dual-module, single-winch, coaxial alternating vector-drag drone (DMSVDD) uses two light coaxially alternating vector-drag agents (each ~0.8-1.0 t with Ø4 m geometry-adaptive canopy and small repositioning propulsor), totaling ~1.6-2.0 t of mobile hardware, yet provides near-continuous ~200 KN traction by alternating pull phases, where the heavy actuation power and mass reside off-module at the winch. Thus, on a mobile-module basis, a 200 kN prop-drone is roughly 6-10× heavier and needs continuous ~1.3-2.1+MW electric feed, whereas a DMSVDD pair is sub-2t and shifts the primary power burden off the drone body. Because drag scales as F=(½)ρAC_Dv² while winch power is P=Fv, holding the required force fixed means the necessary line pulling velocity falls as $1/\sqrt{A}$. Doubling the effective canopy area therefore cuts the needed line pulling velocity and winch power by about 29% ($\approx 1/\sqrt{2}$.), while quadrupling the area, i.e., doubling the diameter, halves the winch power for the same force target; even if the agent mass rises with area, the off-module power source at the winch preserves the system-level efficiency advantage.

S1.8) Tether Selection and Architecture:

In preferred embodiments, each agent tether comprises a 12-strand HMPE (High-Modulus Polyethylene) rope (e.g., Dyneema® SK78 or SK99) specified at a Working Load Limit (WLL) of 2:1 relative to the intended operational load. HMPE provides wire-rope-class breaking strength at a fraction of the weight and exhibits very low elongation under load, improving closed-loop positioning accuracy. Where data/power are required, a hybrid electro-mechanical tether may be used: an HMPE strength member with integrated conductors (e.g., twisted copper pairs and/or optical fiber) embedded in or co-laid with the rope and terminated via wet-mateable subsea connectors at the payload end and strain-relieved terminations at the winch. Splice and termination practices may reduce MBL by up to ~10%; strength deratings are accounted for in WLL and safety-factor calculations. To mitigate dynamic load spikes inherent to low-stretch HMPE, the controller enforces pull-velocity ramp limits and may include in-line elastomeric snubbers at the payload hard points. Note: SK78 offers low creep; SK99 allows diameter reductions for the same MBL.

S1.8.1) Representative Sizing for Rope and Cable Options:

A 50-ton WLL (2:1) implies ≥100-ton MBL after splice derating. Commercial HMPE tables indicate: (i) Dynice 75 (SK75): Ø36 mm has an MBL≈102.9t, satisfying 100 t with minimal margin. (ii) Marlow D12+SK99: manufacturer data shows Ø40 mm≈155t MBL; assuming area scaling, Ø32-34 mm SK99 typically clears ~100-115t. Conductors may carry DC bus power for battery charging and Ethernet-over-twisted-pair or fiber-optic links for telemetry/command. Jackets may be over-braided (e.g., polyurethane or polyester) for abrasion and handling; where required, neutral-buoyancy sheathing is used to minimize catenary error during pose control.

S1.8.2) Containment-Sleeve Tether for Fully Collinear Coaxial Routing:

In some embodiments, a first tether (206*a*) for one module of a dual-module drone is implemented as a longitudinally openable containment-sleeve tether that extends from a winch port to the module's axial through-passage (204*e*), and a second tether (206*b*) for the companion module is routed within the containment-sleeve tether over at least a portion of its length. A port-end opener/closer mechanism disposed at or proximate to the winch port selectively admits the second tether 206*b* into, or releases it from, the interior of the containment-sleeve tether. By positioning tether 206*a* concentrically within the module such that it forms part of the axial through-passage 204*e* and accommodates tether 206*b* within its interior, the assembly achieves fully collinear routing. Note: This arrangement is not shown in the figures.

The containment-sleeve tether (206*a*) may comprise (i) a load-bearing strength member (e.g., HMPE, aramid, polyester) and (ii) a longitudinally openable outer jacket defining an internal lumen for the second tether 206*b*. In one class the jacket is load-bearing and integrates a subsea-rated closure such as a zipper, helical interlock, hinged clamshell, lace seam, or hook-and-loop seam. During setup an opener/closer at the port admits 206*b* into the lumen (interior channel of the sleeve 206*a*) and recloses the jacket to restore a continuous collinear channel to the module through-passage 204*e*. During operation, tether 206*b* slides freely within the internal channel (lumen) of sleeve tether 206*a*, and either tether can carry the full primary load during its respective active (retraction) phase. This coaxial arrangement maintains a fully collinear line-of-action from the winch port to the module's through-passage 204*e* and prevents inter-tether entanglement.

In another embodiment, a third, protective cover-sleeve may be provided to enclose both tethers 206*a* and 206*b* together along at least a portion of their length in a side-by-side (parallel) arrangement. The cover-sleeve may interface with and pass through the axial through-passage 204*e*, such that the bundle centerline of the enclosed tethers positions coaxial with the module's longitudinal axis while the individual tethers remain laterally adjacent. This arrangement reduces the likelihood of entanglement and simplifies handling during deployment and retrieval, but does not render the two tethers fully collinear in the sense achieved by the containment-sleeve embodiment (where one tether forms a central tunnel for the other). In some embodiments, the cover-sleeve is stowed on an auxiliary drum integrated with the winch, enabling coordinated payout and recovery with normal winch operations.

S1.9) Supplemental Components and Propulsion Alternatives for Vector-Drag Drone (VDD) Systems:

In some embodiments, the VDD platform incorporates auxiliary elements that broaden steering and counter-force capabilities. In one example, a large-diameter, multi-bladed propeller (e.g., a seven or more bladed, turbine like propeller) is employed not only as a rotary propulsor but also as an actively controlled drag inducer during the counter-force phase by locking the hub and dynamically adjusting individual blade angles to modulate aggregate drag and vectoring. In another example applicable to a dual-module, single-winch, coaxial alternating vector-drag drone (DMSVDD), Module A carries a terminal pulley instead of a direct rope attachment, while Module B is fixed on the B port side of the rope. More precisely, a continuous rope—where Module B is longitudinally coupled on—runs from winch port B through a terminal pulley on Module A, then through an axial passage (hollow-shaft) in Module B, and back to winch port A. In this configuration, Module A continuously tensions and hauls the rope through its pulley, either while being pulled by the winch or being pushed by its propeller with the pull/release velocities at ports A and B set differentially. By commanding asymmetric pull and release rates at the winch's A and B ports, Module B is repositioned using only the winch's pulling force-transmitted through the terminal pulley on Module A during A's counter-force phase-thereby allowing Module B to omit any on-board thrust device. When the modules meet (or when Module B reaches proximity to the winch), their roles are exchanged and the asymmetric pull/release cycle repeats, such that each module alternately provides counter-force while the other repositions.

In further embodiments aimed at low-signature, low-/non-cavitating operation, alternative propulsion architectures are provided. A first approach uses the existing piston-driven telescopic canopy frame (or a similar retractable drag-inducing element) to generate thrust by cyclically closing and opening the canopy: rapid closing expels the enclosed water to produce thrust, while opening uses check-valve fabric panels to admit flow with minimal resistance so the structure resets with low drag. A second approach translates the telescopic canopy frame along the vehicle's longitudinal axis (e.g., bow-to-stern on a piston-driven track) to produce thrust, then retracts to a low-drag condition before repeating; check-valve canopy features may likewise be incorporated to reduce resistance during the reset stroke. In another alternative, pressurized water—either produced by an onboard positive-displacement actuator or conveyed via hose from a low-/non-cavitating off-board pump at the winch—is discharged through water-jet nozzles positioned on or adjacent to the semi-spherical tether-connection element of the drone.

S2.0) Distributed Vector-Drag Drone Swarm (DVDDS) Variants:

S2.1) Cavitation-Free Variant of DVDDS for Low-Acoustic-Signature Underwater Operations:

Inherent Low-Acoustic-Signature of Baseline DVDDS Systems: The baseline architecture of the Distributed Vector-Drag Drone Swarm System (DVDDS) already supports an operational mode with a significantly reduced acoustic signature due to its non-propulsive-drag-modulation-based-locomotion principle. Unlike conventional underwater vehicles that rely on cavitation-prone, high-angular-velocity rotary thrusters, DVDDS drones maneuver using winch-induced hydrodynamic drag and geometry-adaptive surfaces, inherently decoupling translational force generation from rotary propulsion. For example, winch stations can be mounted on vibration-damped bases and acoustically isolated housings to suppress motor noise, while pull velocities in the range of 5-10 m/s are typically below cavitation thresholds in seawater, especially when velocity ramping profiles—e.g., via PID control—are used. Similarly, drag modulation flaps or deployable vanes operate at relatively low actuation rates using pneumatic or electromechanical servos-avoiding turbulent flow separation that typically induces acoustic scattering. Furthermore, because drag scales approximately with both the square of the relative velocity of the fluid flow along the longitudinal axis of drag-inducing body ($F \propto v^2$) and the effective projected area of the drag-inducing structure ($F \propto A$), cavitation-free operation can be achieved by meeting force requirements primarily by increasing A while keeping the along-tether relative velocity below cavitation thresholds, since A can be increased as needed—within practical limits—in the DVDDS system architecture, which avoids scalability constraints typical of hull-thruster-based systems, including hull-proximity effects, mechanical complexity, cost penalties, and feasibility limits that worsen as thruster size increases. The result is an intrinsically low-acoustic-signature platform, where motion and force control occur with a low-acoustic-signature.

Propellerless Drone Variants with Low-Acoustic-Signature Maneuvering: To further suppress residual acoustic signatures, alternative drone variants may eliminate all rotary actuation mechanisms, including auxiliary propellers. In such configurations, positional readjustment between winch cycles is achieved using non-propeller low-acoustic-signature propulsion modalities. These may include: (i) Pulsatile diaphragm-based pumps, inspired by jellyfish locomotion, using elastomeric domes to generate low-frequency fluid jets; (ii) Undulatory polymer fins, which leverage electroactive polymers or shape-memory actuators to drive bio-mimetic swimming in confined underwater environments; (iii) Vortex ring ejectors, enabling directional thrust through low-velocity toroidal ejection; and (iv) Micro water-jet impulse units, designed for short burst locomotion using compressed water or oscillating membrane valves. All these mechanisms may enable lightweight, fast-response propulsion with minimal acoustic footprint. Because the primary translation force in DVDDS stems from the winch-tether coupling, i.e., the drones are not responsible for generating traction, these modules act only as intermittent maneuvering tools, enabling quick repositioning without compromising low-acoustic-signature or requiring onboard energy storage.

Coordinated Motion with a Low-Acoustic-Signature: In full deployment, the DVDDS functions as a modular, tethered underwater manipulator, where each drone behaves like an intelligent appendage. Consider a spider-like coordination paradigm, where each drone is a "leg," and its tether is the "muscle" that pulls against the surrounding fluid. Together, they "walk" their payload across the ocean through midwater—not by swimming, but by synchronously gripping and dragging the water column through coordinated counter-force application. For example, when a new drone takes over directional control, others yield or stabilize, orchestrating dynamic movement like the sequential gait of a spider. Even if one or more drones are lost, the remaining agents adapt asymmetrically to sustain operation, ensuring fault-tolerant, low-acoustic-signature payload control. According to an embodiment, in a hypothetical industrial or scientific operation, six such drones coordinate the transport of a 15×15×15-meter cubic payload-possibly an autonomous surveillance platform, seabed-deployed communication relay or a typical offshore manifold—from a launch zone (Point A) to a precise terminal waypoint (Point B), or to maintain stationary position at a predefined loitering zone (Point C). During the operation, since no high-angular-velocity propellers are used, no cavitation bubbles form, therefore a low-acoustic-signature is maintained.

S2.2) Pressure-Balanced Undersea Tanker (PB-UT) Integrated with DVDDS:

Disclosed is a pressure-balanced, underwater refueller operated by DVDDS for use in offshore environments with operational constraints waters where surface tankers pose unacceptable risk. In this configuration, pressure equalization is provided by seawater-communicating manifolds on the seawater side of each fuel bladder/rolling-diaphragm, so the cargo membrane always experiences near-ambient pressure at operating depth. This enables a deep, low-disturbance fluid-transfer workflow in which a mobile, pressure-balanced tanker uses ambient hydrostatic head for regulated offload to surface vessels via buoyed-hose rendezvous, while DVDDS supplies low-disturbance positioning and attitude control (no hull-thrusters). When propellerless DVDDS agents are employed, the whole operation including refuelling workflow can be non-cavitating and low-noise.

According to an embodiment, a neutrally buoyant, pressure-balanced tanker is configured as a flooded outer fairing that houses two cascaded clusters of n-number of isobaric fuel modules each. Each module is a flexible bladder or rolling-diaphragm fuel tank isolated from seawater and arranged symmetrically about the longitudinal axis to keep the center of mass fixed as volume changes. Each module includes bow and stern seawater equalization ports feeding an annular manifold on the seawater side of the diaphragm so hydrostatic head is uniform and the diaphragm translates symmetrically. Guides/soft restraints keep the fuel bladder centered to minimize CG migration. Note: the density difference between seawater and fuel does not produce a sustained pressure bias across the diaphragm; equalized head and symmetry—rather than density—keep the fuel centered in normal operation.

Figure 6:
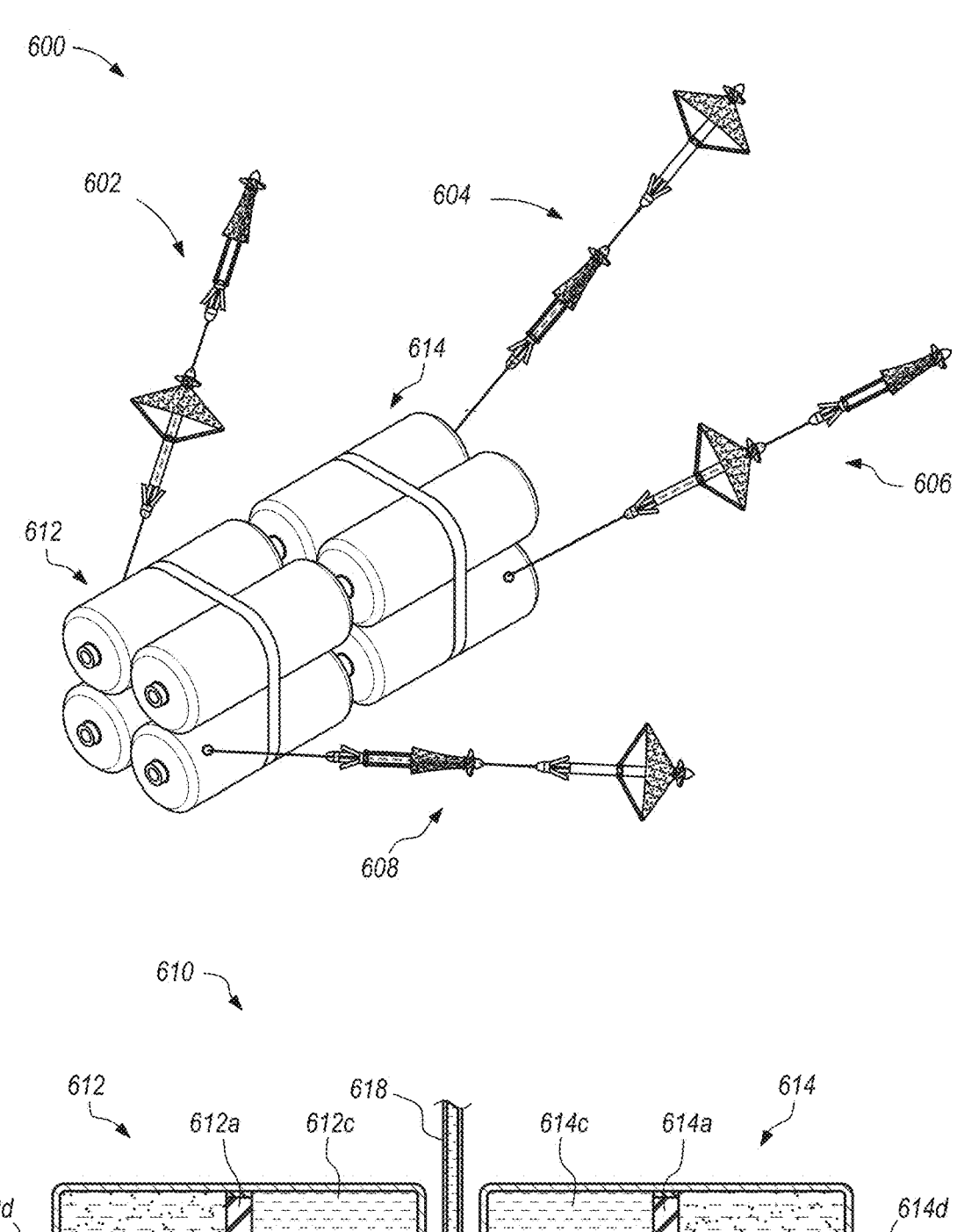
FIG. 6 depicts a Pressure-Balanced Undersea Tanker (PB-UT) integrated with DMSVDD-type agents.

FIG. 6 depicts an eight-module tank set (600) arranged as two longitudinal clusters of four identical cylindrical fuel modules each, integrated with DMSVDD-type agents (602, 604, 606, 608). Only two of the eight fuel modules (612, 614) are indicated with numerals. Within each cluster, the four modules are close-packed in a 2×2 array about the vehicle's longitudinal centerplane. 610 depicts a longitudinal sectional view of a two-module pair (612, 614) coupled end-to-end ("back-to-back") at a sealed central partition (616), while 618 depicts a fuel outlet and/or transfer line. Each module carries a rolling-diaphragm/piston (612a, 614a) with a sealing element (612b, 614b), that separates the inner fuel volume (612c, 614c) from an outer seawater plenum (water-filled cavity) at the outboard end, fed by seawater inlets (612d, 614d). In this back-to-back arrangement, the central partition 616 is sealed against seawater; each module has only an outboard inlet, and both diaphragms move inward toward the partition during offload. As fuel is pumped out, seawater admitted through the outboard inlets (612d, 614d) fills the seawater plenum on the seawater side of the diaphragms (612a, 614a) in a volume substantially equal to the displaced fuel, thereby maintaining pressure balance across the diaphragms. The entire eight-module assembly is encapsulated by a streamlined outer fairing (not shown for simplicity) that provides hydrodynamic smoothness and structural continuity while not acting as a pressure hull.

S2.2.1) Architectural & Operational Details:

Below are the architectural and operational details of DVDDS-Actuated Pressure-Balanced Undersea Tanker (PB-UT) according to embodiments, covering motion/attitude control, constructional considerations, buoyancy management, internal tank arrangement and equalization, and deep-sea refueling logistics.

Motion, Positioning, and Attitude: Motion, positioning, and attitude are provided by a Distributed Vector-Drag Drone Swarm (DVDDS), wherein typically, one agent generates traction while others supply leveraged torque for precise station keeping, e.g., closed-loop positional synchronization with the receiving surface vessel, during refueling, exploiting the $F \propto v^2$ drag law and remote line-of-action advantages disclosed for the vector-drag architecture. FIGS. 1-5 show representative drones, and swarm placements applicable to this embodiment. Propellerless repositioning variants—enabling fully cavitation-free operation—may use undulatory fin drives, pulsatile diaphragm ("jellyfish") pumps, inchworm/caterpillar traction along a tether or hull, or vortex-ring ejectors; other low-shear modalities are within scope.

Constructional Requirements: Because the tanker is isolated from sea-surface loads (e.g., forces induced by waves, wind, etc.) and does not carry external depth-induced loads (i.e., operates in a pressure-balanced mode, i.e., the differential pressure across the cargo membranes is held near zero at depth) the outer fairing is not a pressure hull. Accordingly, both the fairing and the fuel-module casings may be built as light hydrodynamic shells—e.g., glass- or carbon-fiber composites on corrosion-resistant framing, or thin-gauge coated steels—selected for cost and corrosion performance.

Buoyancy Neutralization (separate function): Offloading fuel alters net buoyancy and may require a separate ballast-management function to maintain near-neutral buoyancy over the mission. Example approaches (outside the scope of this section) include expendable or recoverable ballast cartridges, dense-fluid/sand ballast dosing, or actively commanded solid-mass transfer internal to the fairing. Illustrative sizing for 165,000 bbl. of diesel ($\approx$26,235 m$^3$), replacing fuel with seawater increases vehicle mass by $\Delta\rho\cdot V\approx(1.025-0.83)$ t/m$^3\times$26,235 m$^3\approx$5.1$\times10^3$ t. Carrying ~5.1 kt of releasable/transferable mineral ballast (e.g., silica slurry $\rho\approx$2.0 t/m$^3\rightarrow\approx$2,560 m$^3$, or packed sea-sand $\rho\approx$1.6 t/m$^3\rightarrow\approx$3,200 m$^3$) would maintain neutrality as offload proceeds.

Two-Cluster Tank Arrangement: This configuration shortens hydraulic paths, allows cross-equalization manifolds for CG trim, and provides fail-operational behavior: if one module pair is isolated, the remaining modules continue offload with symmetric diaphragm travel. Rolling diaphragms (or membrane cartridges) avoid large sliding seals and are packaged as serviceable cassettes; check-valves/reliefs protect the equalization plumbing; position/pressure sensors on each module report diaphragm travel for controller supervision and to reconcile minor density variations (temperature/salinity).

Other Pressure Equalization Variants: Seawater entering through the inlets may be distributed within a seawater plenum on the seawater side of the diaphragm to maintain a near-uniform hydrostatic head along each module, optionally via circumferential distribution features (e.g., annular manifolds). In a bow-and-stern equalization variant, each module has ports at both ends and the diaphragm translates inward from both ends during offload. In a back-to-back variant, the central partition is sealed to seawater and each module has only an outboard inlet, so both diaphragms translate inward toward the partition. In either case, soft guides and/or restraint features keep the fuel bladder centered to limit center-of-gravity (CG) migration.

Deep-Sea Refueling: The tanker loiters at operational depth (e.g., ~2000 m), releases a buoyed hose with a wet-mate connector, and uses ambient hydrostatic head across the pressure-balanced modules to deliver fuel at regulated rates with minimal pumping; DVDDS maintains 6-DoF pose while avoiding near-hull jets and acoustic wash. The combination—pressure-balanced constant-mass storage plus vector-drag swarm actuation—yields a large-capacity, low-signature undersea oiler that is structurally simple (no thick pressure hull), fault-tolerant, and inherently quiet for offshore logistics.

S2.2.2) A Hypothetical Mission Simulation of a Pressure-Balanced Undersea Tanker (PB-UT) Integrated with DVDDS:

A pressure-balanced underwater tanker (PB-UT) integrated with a Distributed Vector-Drag Drone Swarm (DVDDS) loiters inside a 5-mile-diameter patrol zone at a ~2,000 m standby depth, where background currents are typically weak (design assumption for deep basins: order of cm/s; use 0.02 m/s$\approx$2 cm/s). The tanker executes two 30-nm cruises—(A$\rightarrow$B) to enter the patrol zone and (B'$\rightarrow$C) to exit after operations—and performs 10 refueling evolutions with surface vessels via buoyed-hose rendezvous (no tanker-side pump; natural hydrostatic head+receiver suction). Each refueling evolution comprises ~15 min approach/plug-in, ~2 h fuel transfer, and ~15 min departure. During each refuel, the swarm aligns and holds 6-DoF pose using winch-induced, geometry-adaptive drag vectors (drag$\propto v^2$) rather than hull-mounted thrusters, with two agents alternating as the active traction pair and the remaining agents furnishing leveraged torque and repositioning (design assumption: during each evolution the PB-UT-DVDDS accumulates ~2 nm of cumulative XYZ motion for alignment and stabilization). Chosen cruise regime includes two active agents incorporating both propeller-based thrusters and cavitation free thrusters, pull=2.0 m/s per agent. Propeller-based thrusters are reserved for high-speed underway-transfer, and propeller-less, cavitation-free modes are used for low-speed, low-acoustic-signature station-keeping. Assuming, for first-order sizing, that steady-state vessel velocity is on the same order as the commanded pull velocity, for 4-m canopies this yields a balanced tanker advance velocity$\approx$1.17 m/s$\approx$2.28 kn (derived by equating total traction to fairing drag at that velocity; see assumptions below). Leg time for each 30 nm cruise: $\approx$13.2 hours at 2.28 kn.

During one refueling evolution, the receiving ship requests underway replenishment and supplies electric power via a parallel umbilical released from the tanker. In this fast-cruise underway-transfer mode the swarm synchronizes to the ship's~10 kn convoy speed using the full available traction from all active agents where each active agent switches from non-cavitating thrust to propeller-based thrust to satisfy the much higher re-positioning duty cycle. In this operation, all maneuvering power for ~2.5 h is drawn from the ship, and the tanker opportunistically recharges its batteries over the same umbilical when headroom exists. In this 30-day mission the PB-UT-DVDDS traverses 30 nm$\times$2 (cruises)+2 nm$\times$10 (synching)+Y nm (patrolling) on its own energy, plus an additional 25 nm during the underway-transfer leg using external energy—resetting the subsequent patrol center to the underway-transfer completion location. With representative deep currents of 0.02 m/s ($\approx$0.93 nm/day), holding station inside a 5-mile-diameter zone for 30 days implies Y$\approx$28 nm of cumulative corrective travel ($\approx$0.93 nm/day$\times$30), conservatively taken as $\approx$30 nm including margin—so the tanker covers$\approx$110 nm on its own energy (30 nm$\times$2 cruising+2 nm$\times$10 synching+Y$\approx$30 nm), plus$\approx$25 nm during the underway-transfer leg on external power.

Selected/Calculated Parameters (Implementation Baseline): Fairing envelope Ø20 m$\times$L$\approx$82.6 m (displacement volume$\approx$26,620 m$^3\rightarrow$neutral mass at $\rho_{sw}$=1.025 t/m$^3\approx$27,300 t). Fuel payload 150,000 bbl.$\rightarrow$23,850 m$^3$ (diesel at $\rho_{fuel}\approx$0.83 t/m$^3\rightarrow\approx$19,800 t). Structure & frames$\approx$600t. Initial variable ballast$\approx$5,993 t (rounded$\approx$6,000 t). Energy system 18 MWh (two 20-ft 9 MWh CATL-class containers; $\approx$180 t total). Swarm: six dual-module single-winch, coaxial alternating vector-drag drones (DMSVDDs) agents with 4 m-diameter geometry-adaptive canopies, each including its dedicated winch; mass$\approx$7 t per drone-winch set$\rightarrow\approx$42 t total, tethers/manifolds/aux$\approx$5 t. Traction model (self-power cruise): $v_{pull}$=2.0 m/s per active agent; per-agent drag$\approx$½$\rho C_D$A$v^2$ with $C_D\approx$1.2 and A=$\pi$(2 m)$^2$=12.57 m$^2\rightarrow F_{agent}\approx$31 kN, two active agents$\rightarrow$~62 kN available.

Equating available traction to fairing drag yields a balanced advance velocity $v_{vessel} \approx 1.17$ m/s$\approx 2.28$ kn at this regime. Underway-transfer (external-power) high-speed case: with six active agents and ship-supplied power, achieving ~10 kn convoy speed requires ~1.2 MN total traction; this is met with $v_{pull} \approx 5.1$ m/s per agent, giving $F_{agent} \approx 200$ kN each and $P_{agent} \approx 1.0$ MW ($\approx 6$ MW total) for ~2.5 h. Hotel/avionics load (sensors, controls, comms) assumed ~5 KW average ($\approx 3.6$ MWh over 30 days). All traction uses the $v^2$ drag scaling disclosed herein ($F \propto v^2$).

Results: Distances & times (own energy): A→B 30 nm at 2.28 kn→~13.2 h; B→C same; total cruise time≈26.3 h. Ten synch evolutions at 2 nm each→20 nm in ~8.8 h. Patrolling/station-keeping inside the 5-mile-diameter zone against a representative 0.02 m/s deep current produces Y≈28-30 nm of corrective travel over 30 days (~12.3-13.2 h equivalent at 2.28 kn). Energy (own energy): Using two active agents at $v_{pull}=2$ m/s (per-agent≈62 KW mechanical; ≈75 KW electrical with efficiencies), cruise electrical power≈150 KW. Energy: cruises≈3.9-4.0 MWh; synch motions≈1.3 MWh; patrolling (Y≈30 nm)≈1.9 MWh. Station-keeping during fuel transfer (2 h per evolution; ~50 kW average)≈1.0 MWh total. Hotel/avionics over 30 days≈3.6 MWh. Sum (own energy)≈11.5-12.0 MWh, with a 20% planning margin≈14-14.5 MWh, comfortably within the installed 18 MWh. Underway-transfer leg (external energy): 25 nm at ~10 kn→~2.5 h with six active agents at $v_{pull}$~5.1 m/s; ship power≈6 MW, external energy drawn≈15 MWh. Momentum/impulse delivered to the system in this phase is ~1.2 MN×9,000 s≈$1.1 \times 10^{10}$ N·s (≈11 GN·s) of along-track impulse. Speeds: self-power cruise≈2.28 kn; underway-transfer high-speed≈10 kn (external power), with a practical upper bound ~7 kn if limited to ~3.5 m/S $v_{pull}$ and ~2 MW total.

S2.3) Distributed Power Logistics via DVDDS (Battery Ferrying & Convoy Support) and Autonomous Surface "Power-Bank" Recharging Vessels:

According to certain embodiments, for sustained, long-running operations, a Distributed Vector-Drag Drone Swarm (DVDDS) can be configured as a mobile power-bank swarm that transports pre-charged, pressure-tolerant battery modules to recharge other DVDDS groups that are carrying payloads. Each power-bank agent tows or carries one or more standardized energy modules with wet-mateable electrical connectors (or inductive couplers), inrush-limited DC bus interfaces, and encrypted handshakes for authenticated power transfer. Below are some of the concept of operations. (i) Rendezvous/Transfer: The client swarm exposes a buoyed charge pick-up or a subsea docking receptacle; a power-bank agent mates a module and initiates charging. (ii) Hub Resupply: Power-bank agents cycle depleted modules back to a surface power-bank vessel or a cooperating naval platform for recharge and receive fresh modules; modules are interchangeable to support fleet logistics. (iii) Escort Mode: A power-bank swarm escorts the payload-carrying swarm and performs opportunity charging between maneuvers or continuous top-up during station keeping. Since the architecture is fully modular, energy modules, connectors, and mechanical latches are standardized so DVDDS power-bank agents can work jointly with both naval vessels and autonomous surface power-bank vessels, enabling scalable battery logistics without altering the core vector-drag.

In some embodiments a surface energy-harvesting vessel "Power-Bank" autonomously recharges the payload's batteries. The Power-Bank prioritizes solar-generated electricity with auxiliary wind, and carries energy storage and DC fast-charge electronics and may integrate marine-grade generator sets to ensure uninterrupted operation when solar and wind are insufficient. Workflow: (i) The payload pays out a charge umbilical from an internal reel; a buoyant inflatable float attached to the plug ascends to the surface. The float includes GNSS, a radio/optical transceiver, and a visual locator. (ii) The Power-Bank localizes the float, approaches on a low-wash profile, captures and mates a wet-mate connector (or inductive coupler), and commences charge with an authenticated handshake. (iii) On completion, the Power-Bank releases the float, which the payload reels back in. Variants: In convoy operations, a Power-Bank escorts the swarm and provides opportunity charging between maneuvers; in hub-and-spoke operations, a single Power-Bank services multiple clients by visiting their surfaced floats in sequence. In some embodiments, a Power-Bank vessel escorts a DVDDS and supplies power continuously, while the DVDDS preserves its onboard batteries for self-contained phases (e.g., low-acoustic-signature operations or when surface access is constrained by weather or traffic.

S3) Transitional Intermediate Architectures:

This section introduces intermediate system architectures that bridge conventional drag-based stabilization techniques and the advanced methods disclosed herein. These configurations, while not encompassing the full scope of Dynamic Counter-Force Modulation within a Continuous Drag-Generation Continuum, via Retraction- and Geometry-Induced Drag, nevertheless embody inventive utility. This section includes the utilization of both autonomous drag drones and non-autonomous ballistic units including essential structural elements—such as telescopic deployment, passive winch integration, and modular drag geometries—while further introducing non-rigid body parachute-based applications—demonstrating hybridized applications of some of the 'disclosed concepts' and 'already existing concepts in the art' that can partially or fully be further applied to DVDDS systems.

S3.1) Autonomous Drag Drone based System Architecture and Operation for Floating Vessel Integration:

S3.1.1) Singular Autonomous Drag Drone (Type-B) Configuration for Emergency Drift Resistance:

According to an embodiment a remotely deployable autonomous drag drone system is provided to enable stabilization and drift control in scenarios involving large-scale vessels—such as tankers, cargo ships, or offshore platforms—operating in congested waterways, shallow straits, or heavy seas under engine or steering failure conditions. In a scenario where such a vessel begins to drift uncontrollably due to residual momentum or adverse environmental forces, the proposed system offers a rapid-response, autonomous intervention capability to reestablish stabilization and restore directional authority.

The system comprises a self-propelled, unmanned submersible body (hereafter, the "drag drone") that is: (i) Tethered to a winch via a high-strength cable, where the winch is connected to the host vessel; (ii) Stored onboard in a pre-loaded deployment cradle or rail-guided launcher; and (iii) Equipped with a deployable hydrodynamic drag-inducing apparatus, such as a collapsible canopy, winged panel assembly, or TPDF-derived frame structure. To ensure optimal drag alignment, between a winch and drone pair, the winch may be positioned as close as feasibly possible to the static waterline. This setup enhances horizontal drag transfer by minimizing vertical displacement of the deployed drag body during pullback, where the effective counter-drift force is governed by the cosine of the rope's pulling angle relative to the water surface, expressed as: $F_{horizontal} = F_{drag} \cdot \cos \theta$, where $\theta$ is the angle between the tether direction and the horizontal plane of the water. As θ approaches 0°, horizontal force transmission is maximized. Accordingly, winches may be deployed in this lateral orientation to maximize horizontal braking efficiency during operation.

Upon activation: Step 1) Ejection: The drone is ejected from the vessel in a predefined direction which may be based on using compressed-gas or mechanical launch. Step 2) Positioning: The drone cruises to target destination to position itself by its own steering and propulsion system-which may be an electric engine that gets it power from the tethered rope or cable. Step 3) Deployment: Once the drone reaches to the target destination (from where the standoff distance to the vessel may be, e.g., 100 m to 3,000 m), the hydrodynamic drag-inducing apparatus is deployed. Step 4) Active Drag Generation: At this point, the main vessel's winch system begins rapid retraction of the tether. This retraction induces a hydrodynamic drag force $F \propto \frac{1}{2} \cdot \rho \cdot A \cdot v^2$, where v is the relative velocity between the drag-inducing structure and surrounding fluid, A is the effective frontal area of the deployed hydrodynamic drag-inducing surface (e.g., a pyramidal canopy), and p is the density of the surrounding fluid (typically seawater). The generated force acts as a dynamic hydro-brake, opposing the vessel's motion and producing a stabilizing counter force.

During retraction of the winch, the drone may employ onboard adjustable deflector flaps to generate directional steering forces, enabling fine-tuned trajectory control. Simultaneously, the drag-inducing structure's deployment angle may be actively modulated to trim the effective drag surface, allowing dynamic adjustment of the total hydrodynamic force exerted on the system. The drone may repeat this cycle continuously: (i) upon reaching a proximity to the vessel retract the drag-inducing structure; (ii) cruise to another target destination for repositioning; (iii) redeploy the drag-inducing structure; and (iv) pulling for generating active drag. Note that, the inclusion of a second drag drone operating in coordination ensures continuous counter-force generation, enabling uninterrupted stabilization throughout the operation.

S3.1.2) Distributed Autonomous Drag Drone Configuration for Coordinated Emergency Drift Resistance:

In challenging maritime scenarios—such as emergency drifting in heavy seas involving large-amplitude hazardous wave activity—multiple drag drones may be deployed to form a coordinated stabilization network around the vessel. Each drone is tethered to the host ship via an independent winch system and equipped with GPS, inertial sensors, and basic underwater positioning capabilities. These sensors allow each drone to maintain awareness of its position relative to the vessel and the water currents. The vessel's onboard control unit continuously monitors its drift direction, yaw rate, and heading, using integrated IMU and navigation data. Based on this input, the system adjusts the position and pulling force of each drone to generate counteracting forces and torques.

To oppose linear drift, drones are sent out in directions opposite to the vessel's unwanted motion and then pulled back by their winches to generate braking force through hydrodynamic drag. To correct or resist unwanted rotational movement (e.g., yaw), the drones can be deployed asymmetrically around the vessel. For instance, drones on one side of the vessel can be pulled more forcefully or positioned at wider lateral angles to generate torque around the vessel's center. Each drone's winch is governed by a closed-loop control system (e.g., PID) that adjusts tension dynamically based on real-time feedback. The pulling velocities are modulated to optimize braking force in accordance with the quadratic drag law $F \propto v^2$, enabling high responsiveness with manageable mechanical loads.

Remarkably, all these capabilities can be realized through a relatively non-complex architecture that offers a low-cost, scalable alternative to conventional bow thrusters, which are typically complex and expensive to design, install, and maintain. Even more, this technique may further serve as an auxiliary propulsion and steering mechanism that operates synergistically with the vessel's primary propulsion system—particularly when the winches are mechanically driven by torque derived directly from the main engines. In conclusion, the system's scalability (allowing additional drones based on vessel size or operational demands), adaptability to dynamic environmental conditions (e.g., wind, currents), and cost-effectiveness (given that winch-tethered, drag-inducing structure-based drones are simple to design and manufacture) make it not only suitable for real-time stabilization of large vessels, but also a strong candidate for general-purpose auxiliary use during routine maritime operations.

S3.2) Dynamic Capsize-Mitigation System for Lightweight Vessels:

The disclosed dynamic capsize-mitigation system incorporates tethered non-autonomous drag modules (Type-A). Type-A Module Overview: The Type-A embodiment comprises a tethered, non-autonomous hydrodynamic drag generation module configured for ballistic launch-without self-propulsion and steering capabilities. The drag module, namely a Telescopic Parachute Deployment Frame (TPDF), is housed in a launch-ready state within a launch-tube assembly that comprises a winch to which the drag module is tethered by a cable. Upon activation, the TPDF is ballistically ejected into the water by a high-pressure propulsion device (e.g., gas cartridge or pyrotechnic impulse) while the module remains tethered to the vessel by a high-tensile rope interfaced with the host-controlled winch. Once submerged, the TPDF autonomously transitions into a high-drag geometry via deployment of telescopic arms and a hydrodynamic canopy. The winch modulates tether tension to produce a stabilizing counter-torque on the host vessel, enabling responsive drag control without onboard electronics. Variants may include one-way valve-equipped canopies for unidirectional fluid flow, pyramid or conical canopy geometries for directional stability, and resettable TPDF units with pneumatic retraction for reusability.

The system comprises: one or more launch tubes mounted vertically or near-vertically on the vessel hull, each housing a Telescopic Parachute Deployment Frame (TPDF) in a pre-compressed, launch-ready configuration. Each tube includes a high-pressure launch mechanism—either gas-propelled (e.g., $CO_2$ cartridge) or pyrotechnic impulse—to forcibly eject the TPDF into the water. The TPDF is connected via a high-tensile rope tether to an internal winch system embedded within the launch tube housing. Integrated into the TPDF are multiple telescoping arms, radially foldable around a central shaft and preloaded with a high-torque main coil spring.

This spring is constrained until deployment is triggered by a mechanical disc-based actuator assembly. The winch system is governed by an intelligent control logic unit that receives input from rope encoders (for real-time length and velocity estimation), inertial measurement units (IMUs), and water-surface proximity sensors. Additional sensors, such as optional tilt sensors, may be incorporated to assist in phase transition detection or to enhance the robustness and reliability of the controller's decision-making process. The entire architecture is optimized for rapid deployment, high responsiveness, and onboard autonomy under real-time maritime hazard conditions.

S3.2.1) Launch Tube Assembly:

The launch tube assembly is a vertically or slightly inclined cylindrical structure externally—or internally—mounted on the hull of the vessel, preferably positioned near the vessel's center of mass to ensure symmetric dynamic response. It houses the Telescopic Parachute Deployment Frame (TPDF) in a pre-folded and mechanically locked state, ready for immediate deployment. Launch initiation is accomplished via a high-pressure propulsion system—either a compressed gas canister (e.g., $CO_2$ or nitrogen) with a solenoid-actuated release valve or a compact pyrotechnic impulse cartridge—delivering rapid axial ejection of the TPDF into the water.

The launch tube further integrates critical components including a rope spool that feeds tether to the winch mechanism, a water-level proximity sensor aligned along the launch axis for real-time sea-level offset estimation, electrical relays for actuation control, and a sealed power/data interface linked to the central control unit. The launch tube's axial alignment and outlet geometry are engineered to minimize the risk of deflection or ricochet during high-velocity ejection, ensuring consistent entry trajectory and reducing bounce-induced misalignment, particularly under angled vessel orientations.

S3.2.2) Telescopic Parachute Deployment Frame:

The Telescopic Parachute Deployment Frame (TPDF) is a compact, foldable, umbrella-like mechanical assembly engineered to rapidly transform from a stowed configuration to a high-drag hydrodynamic geometry upon underwater deployment. At its core lies a rigid central shaft featuring a conical nose ballast-preferably fabricated from lead or a comparable high-density material-serving as both a stabilizing mass and a trajectory-correcting tip to mitigate angular deviation or bounce effects during water entry. Surrounding this shaft is a telescopic arm array, each arm being pivotally mounted to a sliding collar and preloaded with a coil spring, pneumatic or other functionally equivalent mechanism that enables symmetric radial extension upon activation.

These arms are structurally coupled to a canopy composed of rip-resistant, low-stretch hydrodynamic textile, optimized for rapid inflation and sustained directional drag under turbulent conditions. A single tether rope is affixed at the canopy hub and runs internally through the launch tube to the winch system. According to various embodiments, the deployed TPDF assumes a triangular or square-based pyramid shape, maximizing directional stability and predictable descent orientation while minimizing deployment latency and mechanical complexity. In certain embodiments, the canopy incorporates one-way check-valve type flaps that permit water flow in the deployment direction while resisting backflow, thereby accelerating canopy inflation and maximizing directional drag efficiency.

S3.2.3) Mechanical Actuator Disc Subsystem:

The TPDF further incorporates an integrated mechanical actuator disc subsystem that governs both the deployment initiation and terminal shutdown events without reliance on onboard electronics. Housed within the central shaft of the TPDF, the subsystem consists of a disc plate constrained axially between two calibrated coil springs. Three key mechanical relay interfaces are positioned along the disc's travel path: a rear-position Relay A (a contact or magnetic switch) for triggering canopy deployment, a forward-position Relay B serving as a passive mechanical stop during tensioned operation, and a central-position Relay C, which functions as a cutoff switch for halting the winch serving as a mechanical fail-safe mechanism. During Phase 1 (aerial launch), the disc remains centered in a neutral state.

Upon water entry, hydrodynamic drag on the disc forces it rearward, compressing the aft spring until it actuates Relay A. This triggers the release of the main canopy deployment mechanism—e.g., spring—initiating full radial arm extension—optionally moderated by a retarder mechanism, which delays canopy inflation to allow deeper water penetration before significant hydrodynamic deceleration occurs. During Phase 2 (active tether pulling), the disc is displaced forward against Relay B by sustained rope tension and hydrodynamic drag, where it remains stable throughout drag generation. As the TPDF exits the water, drag forces drop sharply, allowing the restoring spring to return the disc to its original centered position, thereby contacting Relay C. This event signals the winch system to terminate pulling. This purely mechanical subsystem provides reliable, water-activated deployment and shutdown logic without requiring electronics within the TPDF assembly, enhancing robustness and manufacturability.

S3.2.4) Electric Winch and Rope Module:

The system includes a compact, high-torque electric winch housed within or directly adjacent to the launch tube, responsible for controlling the tethered deployment and retrieval dynamics of the TPDF. The winch is mechanically coupled to a high-tensile, low-stretch rope that connects to the canopy hub of the TPDF. Upon completion of the TPDF's descent to the target operational depth—e.g., determined via a pre-calibrated rope length correlated with launch tube inclination and real-time water-level proximity sensor feedback—the winch initiates a rapid pulling sequence. This active pulling not only accelerates canopy inflation but also generates a large hydrodynamic counter-torque, leveraging the nonlinear relationship between drag force and pulling velocity, i.e., $F \propto v^2$.

A digital Proportional-Integral-Derivative (PID) controller continuously governs the pulling dynamics, adapting in real time to vessel roll conditions, rope tension, and drag resistance. This control logic enables high initial acceleration to induce peak drag, followed by dynamically reduced velocity as the vessel begins to stabilize-thereby optimizing torque application while minimizing slippage, rebound effects, or structural overloads. Pulling is automatically terminated based on input from the actuator disc's Relay C (indicating water exit), tilt-sensor-based stability restoration, or predefined override conditions such as rope slack detection or timeouts. Else—if none of the above termination signals are triggered—pulling is halted once the rope length corresponds to a predefined safe distance—typically set according to the vessel's draft height.

S3.2.5) Sensor and Control Electronics:

The stabilization system is governed by a centralized control unit that manages deployment, winch actuation, and termination events through a coordinated sensor suite. A high-resolution IMU continuously monitors vessel attitude (roll, pitch, yaw, and angular acceleration) and forms the primary trigger in Wave Impact Mode, detecting transient dynamics that precede capsizing. A rope encoder tracks the deployed tether length, while a water-level proximity sensor—typically a laser or ultrasonic unit—mounted near the launch tube outlet provides real-time sea-surface offset. Together, they estimate descent depth without relying on underwater electronics. Mechanical relay signals (Relay A for deployment confirmation, Relay C for surface reentry)

are transmitted via the tether and processed by the logic unit to synchronize canopy deployment and winch shutdown with hydrodynamic phases.

The system may operate in two distinct hazard response modes-Wind Gust Mode and Wave Impact Mode—and each may utilize a tailored logic. For example, Wind Gust Mode may respond to sustained lateral tilts (primarily roll) detected by the IMU or distance exceeding a predefined threshold as measured by the proximity sensor, indicative of excessive heel or asymmetrical hull elevation, typical in multihull vessels like sail catamarans. Upon triggering, descent depth may be computed using the rope encoder and launch-tube height offset, initiating active pulling. Wave Impact Mode may rely on broader IMU analytics to identify large oscillatory roll-pitch excursions and triggers a similar pull sequence. Both modes use the same mechanical and electrical subsystems and employ a single-tether-per-TPDF architecture for enhanced reliability and simplicity. Safety interlocks and optional AI-based filters may be integrated to refine detection thresholds, suppress false positives, and tailor system response to vessel-specific dynamics.

S3.2.6) Phases of the Operation:

The system operates in two main phases: (i) Phase 1: Launch and Descent; and (ii) Phase 2: Drag Activation via Pulling. Each phase is tuned for mechanical responsiveness and real-time adaptability based on vessel state and water interaction. These phases collectively enable rapid deployment and hydrodynamic stabilization with minimal latency.

S3.2.6.1) Phase 1: Launch and Descent:

Once the system is armed—either manually or automatically during predefined risk conditions—it awaits an ignition signal. There are two possible scenarios in this sense: (i) Wind Gust Mode and (ii) Wave Impact Mode.

In Wave Impact Mode, the system must respond to dynamic spatial disturbances such as roll, pitch, and sudden acceleration profiles. Therefore, this mode relies on an onboard Inertial Measurement Unit (IMU) or 3-axis tilt sensor mounted near the vessel's center of mass. The control logic continuously evaluates angular deviations and time derivatives (e.g., angular velocity, acceleration spikes) to detect hazardous wave-induced events. When the lateral tilt or roll angle exceeds a predefined threshold for a critical duration, the launch sequence is triggered. On the other hand, in Wind Gust Mode, the needed signal may be solely generated based on vessel geometry and static orientation. For example, the water-level proximity sensor mounted in the launch tube may determine whether to initiate launch based on the measured distance from the tube outlet to the sea surface. This measurement effectively represents the hypotenuse of a right triangle, where the vertical leg corresponds to the vessel's elevation above water and the hypotenuse extends along the tilt-induced orientation of the tube, allowing accurate inference of the launch geometry during wind-induced heel.

Upon detection, the control unit activates a compressed-gas or pyrotechnic launch mechanism integrated in the vertical (or near-vertical) launch tube. The TPDF, stored in a folded state, is ejected forcefully from the tube and enters the water at high velocity. Once the TPDF is deployed, descent tracking is performed using rope encoders and, optionally, the water-level proximity sensor for added precision. For example, a water-level proximity sensor mounted inside the launch tube can measure the slant distance from the tube outlet to the sea surface-effectively the hypotenuse of a right triangle defined by the vessel's tilt. This measurement allows the system to calculate the required rope length for achieving a target submersion depth, compensating for vessel orientation. When the rope length corresponding to the calculated descent depth is reached, as measured by the rope encoder, the winch initiates the pulling sequence.

During descent, the telescopic arm system is still locked in place, while the nose ballast, often made from lead or other high-density material, ensures vertical alignment and suppresses bounce or lateral deflection, even under strong water surface tension, e.g., induced according to wave topography, or angular vessel tilt, e.g., induced by wind gusts, or both. The central shaft of the TPDF houses a disc plate as the sensor and actuator that initiates the deployment of the telescopic arms. The disc plate actuator is located near the rear end and constrained by two opposing coil springs creates the signal. As the TPDF enters the water, hydrodynamic resistance pushes the disc backward along the shaft axis. When the disc reaches its rearward travel limit, it triggers Relay A, a mechanical or magnetic contact that releases the tension on the main deployment spring. This in turn initiates the unfolding of the telescopic arms and deployment of the canopy structure. In some embodiments, a retarder is used further in order to delay the initiation of the unfolding process in order achieve deeper penetrations into the water.

The deployed canopy is fabricated from a hydrodynamically optimized textile with low stretch and high tear resistance, such as Kevlar-reinforced fabric. In some embodiments, the canopy is fitted with check-valve-type flap structures, allowing fluid flow in only one direction—outward from the centerline—thus accelerating inflation and minimizing backward water pressure during rapid pulling. These flaps improve deployment symmetry and shorten inflation time, especially in turbulent or aerated water columns. In further embodiments, the canopy may additionally include small vent openings near its apex region, allowing limited upward water escape during drag. This design, inspired by aerodynamic stabilization principles used in parachute canopies, helps reduce oscillatory motion during high-speed underwater movement. Although it may slightly reduce total drag force, it enhances directional stability and prevents yaw or wobble during tether retraction.

Note that: The TPDF generally assumes a pyramid-like shape after full opening, such as configurations with quadrilateral, pentagonal, or hexagonal bases, ensuring stable descent and consistent directional drag during Phase 2; however, the invention is not limited to these shapes—any canopy geometry compatible with telescopic deployment and capable of generating directional hydrodynamic drag may be used.

S3.2.6.2) Phase 2: Drag Activation via Pulling:

Once the TPDF reaches a predefined target depth (e.g., 3 to 4 meters), the system enters Phase 2. Depth is not measured by submerged sensors, but inferred via tether rope encoder data and launch tube-to-waterline offset, which is calculated in real-time using a water-level proximity sensor (such as a downward-pointing laser); however, the invention is not limited to this configuration, and the use of alternative submerged sensor technologies remains within the scope of the system design. This hybrid approach reduces the cost and complexity of waterproof electronics inside the TPDF, relying instead on robust external instrumentation. When the calculated depth is reached, the internal winch initiates high-velocity tether retraction, pulling the TPDF upward and generating significant hydrodynamic drag force.

The winch is governed by a closed-loop PID controller, which continuously modulates pulling velocity and torque based on rope tension, tilt angle trends, and acceleration data. This adaptive mechanism allows the winch to start aggressively to maximize the velocity-dependent drag force ($\propto v^2$), then taper as stabilization begins. The pull velocity is critical to system performance: higher velocities result in exponentially greater drag, allowing for reduced canopy surface area without sacrificing torque. This active drag generation principle is a cornerstone of the invention's miniaturization and effectiveness. During pulling, canopy deployment may continue, with the pulling force contributing to full structural inflation.

As the winch operates, reverse drag generated on the TPDF's shaft assembly exerts a forward force on the disc plate. This moves the disc to its forward stop position, known as Relay B. While Relay B is passive and does not trigger any system event. Relay B helps stabilize the position of the disc plate during Phase 2, mitigating the effects of transient hydrodynamic disturbances or turbulence that may arise during tether pulling. This stabilization prevents unintended forward-backward oscillations of the disc plate, which could otherwise cause premature return to the rest position and inadvertently trigger the winch halt mechanism. As a safety measure, once the TPDF nears the water surface, the loss of hydrodynamic resistance allows Spring B to restore the disc to its neutral resting position. This movement triggers Relay C, which is hardwired to halt winch operation.

This auxiliary safety mechanism serves as a fail-safe in case the torque-based control logic does not function as intended. It prevents the winch from continuing to pull the TPDF beyond the water surface—either partially or fully airborne—which could otherwise present impact hazards to the vessel or crew. In addition to the Relay C cutoff, the winch controller receives real-time vessel tilt data. If the vessel's lateral inclination drops below a predefined stabilization threshold, the controller may terminate pulling early, assuming the corrective torque was sufficient. Further redundancy is added through tension loss detectors—if the rope suddenly goes slack due to disconnection or failure, the system enters shutdown mode.

If none of the above-described conditions are met during the pulling phase, a final fallback halt signal is triggered based on the pre-calculated tether length. This signal is derived from rope encoder data and terminates pulling once a safe rope length is reached—typically determined by the vessel's draft characteristics (e.g., 2 meters for a catamaran with a 1-meter draft). Further a time-based override may also be incorporated, ensuring the winch does not operate beyond a safety timeout if other mechanisms fail.

S3.2.7) Self-Retracting and Re-Setting TPDF Deployment:

Self-Retracting TPDF Variant (Type A2): In an alternative embodiment referred to as Type A2, the telescopic drag-inducing frame is deployed and retracted using a dual-mode (Type-A2a) or dual-piston (Type-A2b) pneumatic actuation system, where support for multiple deployments and retractions per mission is contingent on propellant cartridge capacity. The Type A2 architecture is especially beneficial for autonomous vessels, large commercial ships, naval or offshore stabilization platforms where physical access to the launcher is restricted, and autonomous reusability is mission-critical. In this mode,—in parallel to the self-retraction process of the TPDF—the pulling winch continues actuation to draw the retracted TPDF assembly into the launch tube housing. Upon full seating within the tube, the system transitions into an armed state, ready for subsequent deployment.

Type: A2a: Instead of relying on spring-loaded mechanical release, a $CO_2$ cartridge-powered piston initiates extension of the TPDF arms upon launch. The actuator is housed within the TPDF shaft or frame core and receives a deployment command via a signal from the control logic or a mechanical relay. After a hazard has subsided, and upon receipt of a reset command—typically triggered by vessel stabilization or a timer—the system reverses gas flow through a counter-gas input port, retracting the TPDF into the launcher tube. The dual-port piston design ensures smooth bi-directional operation. Because gas pressure can be easily regulated, this variant enables fine control over extension and folding speeds, and supports multiple cycles per voyage depending on cartridge size and vessel class.

Type: A2b: The deployment and retraction of the telescopic drag-inducing frame are managed by two independent piston-cylinder assemblies, arranged in a complementary reciprocal configuration. Each piston governs motion in a single direction: one piston-cylinder unit initiates outward deployment of the TPDF arms upon hazard detection, while the second unit performs inward retraction of the arms after stabilization is achieved. During operation, only one piston is actively pressurized at a time, while the other functions in passive exhaust mode. That is, when the deployment piston is triggered by a $CO_2$ or pressurized-gas burst, the retraction piston's internal valves open to vent gas freely, thereby minimizing back-pressure and mechanical resistance. Similarly, during retraction, the deployment piston's ports open to exhaust flow, ensuring smooth bidirectional actuation with minimal parasitic losses.

Note: While $CO_2$ is a preferred propellant due to compact storage and widespread availability, the system is not limited to $CO_2$. Any suitably compressible, inert, or non-flammable gas (e.g., nitrogen or argon) may be used depending on vessel requirements and operational constraints.

S3.3) Hydro-Braking Variant for Drift and Rotational Stabilization:

According to the embodiments, in addition to capsize mitigation, the system may be configured to address sudden lateral drift, yaw instability, or steering loss by operating in a hydro-braking mode. This alternative use case enables the system to act as an emergency deceleration or rotational damping tool, particularly in scenarios such as rudder jamming, motor failure, asymmetric thrust, or extreme side-force moments in heavy seas. In this configuration, the launch tubes are mounted either internally or externally along the vessel's hull in a generally horizontal and slightly outward-facing orientation. Their axes are preferably angled marginally upward to increase underwater trajectory range.

To ensure optimal drag alignment, the launch tubes may be positioned as close as feasibly possible to the static waterline. This setup enhances horizontal drag transfer by minimizing vertical displacement of the deployed drag body during pullback. The effective counter-drift force is governed by the cosine of the rope's pulling angle relative to the water surface, expressed as: $F_{horizontal} = F_{drag} \cdot \cos \theta$, where $\theta$ is the angle between the tether direction and the horizontal plane of the water. As $\theta$ approaches $0°$, horizontal force transmission is maximized. Accordingly, the hydrodynamic drag-inducing assemblies—such as Telescopic Parachute Deployment Frames (TPDFs)—are deployed in this lateral orientation to maximize horizontal braking efficiency upon activation.

In configurations where multiple hydro-brake units are installed at critical locations along the vessel's hull—for example, one at the bow, one at the stern, and multiple units at port and starboard sides—each unit operates under independent control. These distributed units can be selectively activated and controlled based on dynamic conditions to enable directional and differential hydrodynamic braking.

The control logic may utilize an inertial measurement unit (IMU) or yaw rate sensor to detect uncommanded lateral drift, undesired rotational motion (yaw), or emergency deceleration requirements. Upon detecting such a condition, the system autonomously selects the appropriate units for deployment, thereby generating a directional counter-torque to resist spin or drift. This enables both symmetric and asymmetric stabilization depending on the disturbance profile.

In such configurations, each braking TPDF may be equipped with a dedicated winch system configured for PID-based tension regulation. By adjusting the pulling velocity dynamically, the system can modulate the drag force in real-time, leveraging the quadratic drag law (F∝v²) to create substantial resistive force at manageable system sizes. The pulling force not only increases braking efficiency, but also shortens the time to maximum drag, enhancing system responsiveness. Optionally, hydro-braking logic may be integrated with the vessel's engine or thruster control system. In such configurations, deployment of the hydro-brake triggers a synchronized reduction or cutoff of propulsion, allowing the drag-inducing canopy to decelerate the vessel without opposition from engine thrust.

Together, these features enable the system to function not only as a capsize prevention tool, but also as a general-purpose hydrodynamic stabilization system capable of emergency braking, drift damping, and attitude correction during propulsion failure or sudden environmental disturbances, according to the embodiments. Note: The hydro-braking units may be designed for rapid retraction and reuse. The winch system may reel the TPDF back into its launch tube following completion of the stabilization event or may continue operation as part of an ongoing mission, since the design supports multiple deployments per voyage without requiring manual intervention.

S3.4) Continuous Counter-Force Generation based on Multiple Launch Assemblies:

In order to maintain sustained braking or stabilization through sequential actuation, two or more launch assemblies may be deployed in an alternating sequence, such that while one system (e.g., System A) approaches the vessel and prepares for retraction, the other system (e.g., System B) is triggered and launched to begin the next drag cycle. In other words, while System A is in the non-active state, such as during retraction, launch tube insertion, re-launch and descent, System B generates resistive hydrodynamic drag, continuing the stabilization effort. For example, once System B nears the vessel, System A is relaunched, establishing a closed operational loop. In this configuration, continuous counter-drag can be achieved by alternating between synchronized systems without requiring pause, downtime, or manual reset. This approach is particularly effective for self-retracting TPDF variants (e.g., Type A2) where autonomous recycling is available. However, it is also appliable to non-self-retracting TPDF variants (e.g., Type A1) via manual operation.

Figure 7:
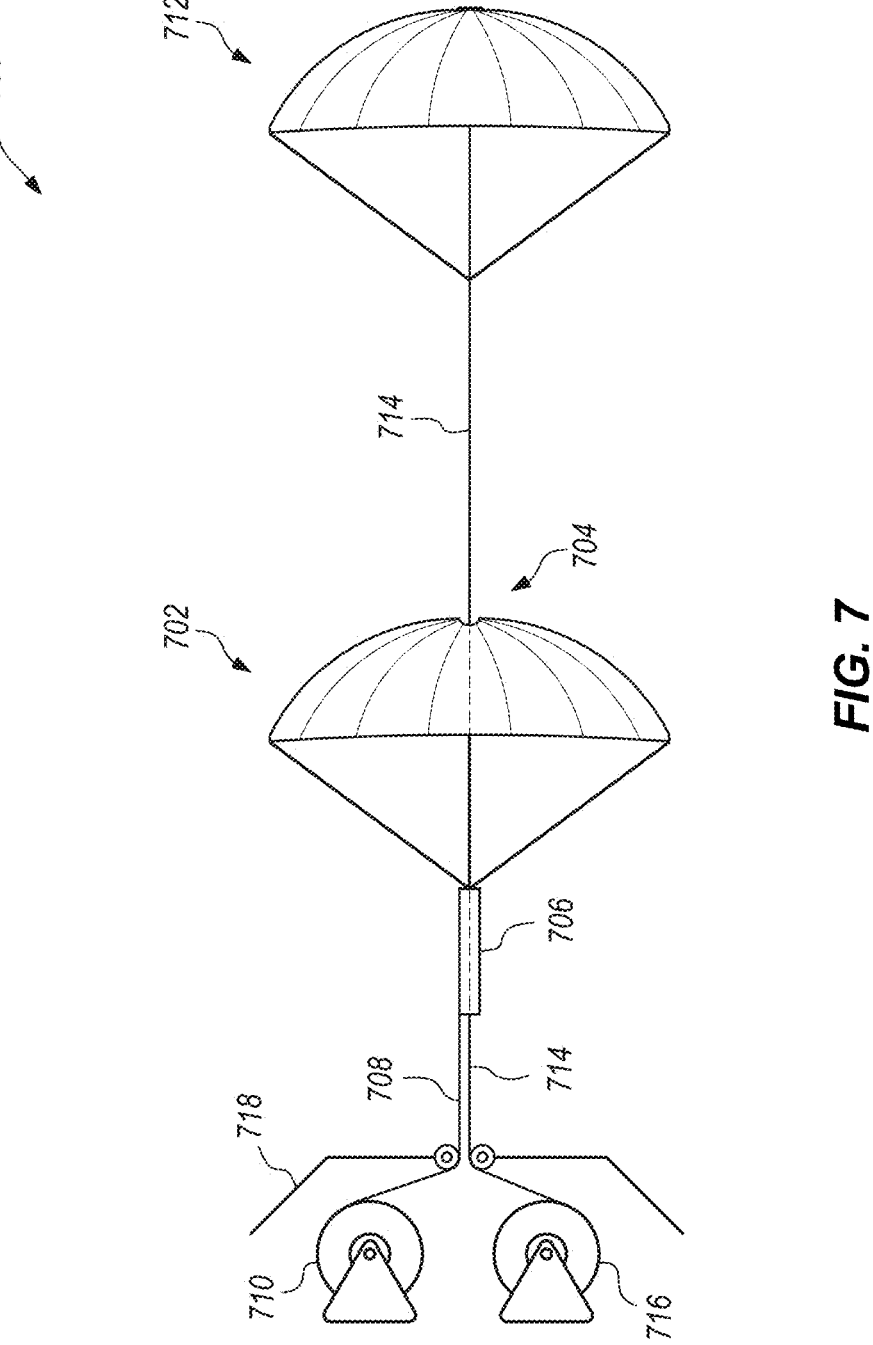
FIG. 7 details a dual-parachute alternating drag system architecture for aero-braking.

S3.5) Continuous Counter-Force Generation based on a Multiple-Parachute System Aligned Along a Single Longitudinal Axis:

In an alternative embodiment, a coaxial dual-parachute configuration is employed to enable continuous and regulated hydrodynamic (or aerodynamic) stabilization that is particularly suitable for aerospace vessels in the context of atmospheric braking. FIG. 7 details the dual-parachute alternating drag system architecture within a two-winch configuration. In this configuration, the parachute 702 is actively coupled to the winch 710 by the tether 708 and is located forward along the axis, while the parachute 712 trails behind and is connected to the second winch 716—or alternatively is connected statically (passively) in some variants. The tether 714 of the parachute 712 passes coaxially through a central passage in the parachute 702 and continues along the same axis, with both tethers (708, 714) housed within shared or parallel guide tubes (706) that allow independent manipulation of each parachute while maintaining axial alignment. At the vehicle stern (718), the tethers are guided outboard via pulleys (fairleads).

During operation, the winch system engages in a two-phase cyclical pulling sequence. In Cycle A, the winch 710 actively pulls the parachute 702 over a distance $\Delta L_A$ at high velocity, generating strong hydrodynamic or aerodynamic braking via active drag force governed by the relation $$F_{active\ drag}^{(702)} \propto \left(V_{pull}^{(702)}\right)^2.$$

During this phase, the parachute 712 remains deployed and provides passive resistance due to fluid interaction. Once $\Delta L_A$ is completed Cycle B starts. In Cycle B, the winch 710 ceases pulling and starts releasing. The parachute 702 is then pushed backward along the axis (toward the parachute 712) by the natural drag that is induced by the residual momentum of the vessel. This restores it to the original launch configuration. Simultaneously, the winch 716 initiates pulling of the parachute 712, which now becomes the active braking element. Once $\Delta L_B$ is completed Cycle B ends. Accordingly, the winch 716 ceases pulling and starts releasing, while the winch 710 initiates pulling of the parachute 702, which now becomes the active braking element. This alternation continues indefinitely.

Each winch system may be coupled to a PID controller or adaptive logic that dynamically adjusts the pulling rate based on generated counter-force, vessel velocity, sea state, or orientation feedback (e.g., IMU data). This allows the system to: (i) maintain optimal pulling force magnitude (via F∝v²); (ii) prevent tether slack or over-tensioning; and (iii) synchronize dual parachute operations without mechanical interference. To maintain system effectiveness and directional stability, the control system may satisfy the following velocity conditions along the tether axis: during the phase in which parachute 702 is actively pulled, $$v_{parachute}^{(702)} > v_{vessel}$$

and the trailing parachute 712 satisfies $$v_{parachute}^{(712)} < v_{vessel};$$

during the phase in which parachute 712 is actively pulled, pulling $$v_{parachute}^{(712)} > v_{vessel}$$

and the trailing parachute 702 satisfies $$v_{parachute}^{(702)} < v_{vessel}.$$

Critically, this dual-system architecture guarantees that at least one parachute is always exposed to the flow field, ensuring persistent generation of passive drag force even during transitions between cycles.

In another—dual-parachute alternating drag system—embodiment, two tethered parachutes (A and B) are operated by a single winch (or equivalent pulling device) and arranged coaxially, with the B-tether routed through an axial passage of canopy A and/or a tether-guidance tube to maintain a colinear line-of-action with the vehicle's longitudinal axis. In Cycle A, Parachute A is actively pulled to generate dynamic drag while Parachute B is released until they are within a predefined proximity to each other. In Cycle B, the roles reverse—Parachute B is pulled as Parachute A is released to passively restore. In this configuration, because the repositioning of the non-active parachute is achieved by ambient-flow and vessel-way-induced passive drag—without onboard thrusters as used in DMSVDD drone modules—, the commanded pull and release rates are bounded by the passively achievable restore velocity of the non-active parachute under ambient-flow and vessel-way effects; accordingly, the pull velocity must not exceed that passively achievable restore velocity. Once this rate constraint is satisfied, this cyclic arrangement ensures continuous force application for stabilization or braking, while coaxial routing maintains a line-of-action substantially colinear with the system axis, thereby minimizing yawing moments and tether interference and providing a symmetric, continuous vector-drag output. This distinguishes the system from state-of-the-art single-phase, episodic parachute systems—such as active riser/piston-based parachutes used for soft landings—that are incapable of dynamic modulation or continuous force adaptation.

Note: This architecture may be adapted for aero-braking in spacecraft or reentry vehicles. In such applications, the system replaces marine winches with electromagnetic spools or gas-driven retraction actuators, while maintaining the tether-routing and axial symmetry principles described herein. This architecture may be further extended to incorporate configurations involving more than two parachute-based drag elements, operating in coordinated active and passive modes to enhance aerodynamic braking performance and directional stability.

EXAMPLES OF POSSIBLE INDUSTRIAL IMPLEMENTATIONS

Deep-Sea Robotic Payload Dynamic Positioning & Transportation:

A Distributed Vector-Drag Drone Swarm System (DVDDS) manipulates submerged or neutrally buoyant payloads with six degrees of freedom by coordinating multiple tethered agents around the load and commanding pulling velocities and geometry-adaptive drag so that counter-forces scale approximately with the square of the magnitude of the component of the relative velocity along each tether ($F \propto v^2$). Because actuation is applied remotely through substantially colinear lines-of-action rather than hull-mounted jets, the swarm delivers precise, quiet pose control while being compatible with propellerless, cavitation-free repositioning for low-acoustic-signature missions. Furthermore, unlike surface-referenced DP control, DVDDS systems are virtually decoupled from surface conditions, including depth-related operational complications inherent to surface-referenced DP. Optional dual-module, single-winch, coaxial agents (DMSVDDs) provide near-continuous traction during hand-offs. Overall, the swarm executes phased orchestration (gait-like alternation of active-pull and passive repositioning) so that at least one agent can furnish counter-force while others reset; DMSVDD channels maintain continuity on selected axes, and HMPE tethers with ramp-limit control manage dynamic loads.

Representative payload classes already contemplated in this specification include: (i) Subsea manifolds/templates and pipeline components used in field installation (illustrated with the swarm around a cuboidal subsea module in FIG. 3); (ii) Prefabricated segments of submersible structures and underwater tunnels/large, immersed bodies with challenging hydrodynamics; (iii) Compliant towers and other large offshore structural elements requiring leveraged torque for attitude control; (iv) Dive bells and related intervention packages positioned thruster-free near work sites; (v) Legacy or temporarily incapacitated vessels treated as passive loads for stabilization/translation at depth (background problem framing and transitional architectures); (vi) Host-vessel augmentation—e.g., precise pose trim of an underwater vehicle using external agents (see FIG. 4); (vii) Pressure-Balanced Undersea Tanker (PB-UT) modules or the integrated tanker body transported or held in pose by DVDDS (see FIG. 6); (viii) Defense/dual-use payloads where low observability is critical, such as autonomous surveillance platforms and seabed-deployed communication relays, enabled by the cavitation-free variant and swarm fail-tolerance. Note: For Lea, Deniz and Sinan.

The invention claimed is:

1. An underwater vector-drag dynamic positioning system for an underwater payload ("payload"), the system comprising:

(a) a plurality of dual-module, single-winch, coaxial alternating vector-drag drones ("drones") spatially distributed around the payload and positioned such that respective tether lines-of-action are oriented to generate controllable forces and moments on the payload, each drone including:

(i) a first underwater module including a geometry-adaptive drag-inducing structure and one or more control surfaces, the geometry-adaptive structure and/or the control surfaces being configured to modulate hydrodynamic drag magnitude and direction, and an auxiliary intermittent repositioning subsystem operative during non-pull phases;

(ii) a second underwater module disposed coaxially with the first module including a geometry-adaptive drag-inducing structure and one or more control surfaces, the geometry-adaptive structure and/or the control surfaces being configured to modulate hydrodynamic drag magnitude and direction, and an auxiliary intermittent repositioning subsystem operative during non-pull phases;

(iii) a first tether coupled to the first module and a second tether coupled to the second module;

(iv) a local controller;

(b) a corresponding plurality of controllable dual-port winches mounted to the payload, each winch having a first port driving the first tether and a second port driving the second tether of a corresponding drone, each winch being dedicated to a single corresponding drone;

(c) for each drone, a coaxial routing in which at least one of the first and second modules defines an axial through-passage along a common longitudinal axis and the tether coupled to the other module passes through the axial through-passage such that the line-of-action of the tethers is maintained substantially collinear with the common longitudinal axis, thereby reducing yawing moments and tether interference during operation;

(d) a coordination controller, implemented centrally and/or distributed across the payload, the drones, and/or the winches, in communication with the local controllers and the winches and configured to command winch velocities, drag-geometry settings, and operation of auxiliary intermittent repositioning subsystems, including onboard propulsion where present, for the plurality of drones, and to control the spatial disposition of the drones relative to the payload;

(e) wherein, for each drone, the local controller, together with the corresponding winch, is configured to execute alternating phases in which, in a first phase, the winch retracts the first tether while releasing the second tether and, in a second phase, the winch retracts the second tether while releasing the first tether, the module undergoing release during each phase being positioned by its auxiliary intermittent repositioning subsystem, the local controller further being configured to command dynamic adjustment of the geometry-adaptive drag-inducing structures and the control surfaces to set the hydrodynamic drag vector, in both magnitude and direction, including, for at least one of the modules, independent of control surfaces, intentionally altering the deployed drag-inducing structure's geometry asymmetrically so as to produce a lateral component of hydrodynamic drag for attitude control, such that at least one of the modules remains in a drag-generating configuration throughout the alternating phases, thereby providing a substantially continuous vector-drag output for the corresponding drone; and, during each release phase, the local controller further being configured to steer the repositioning module to adjust its attitude in response to changes in the attitude of the module undergoing retraction, so that it remains substantially collinear with the common longitudinal axis of the module undergoing retraction, thereby suppressing yaw moments, minimizing tether interference, and maintaining the repositioning module's tether in tension along a line-of-action substantially collinear with the common longitudinal axis throughout operation, including during hand-off intervals;

(f) wherein modulation of pulling velocities in combination with adjustment of the geometry-adaptive drag-inducing structures and the control surfaces provides primary translational traction and attitude control via hydrodynamic counter-forces that increase approximately with the square of the magnitude of the component of the relative velocity of the respective drag-inducing structure with respect to the surrounding fluid along the retracted tether; and (g) wherein the coordination controller includes a state-estimation module configured to fuse inertial data with at least one of acoustic, electromagnetic, or tether-based measurements and to command the winches and the drones' local controllers to maintain a six-degrees-of-freedom pose of the payload within a controller-specified tolerance band around a target setpoint or along a commanded trajectory.

2. The system of claim 1, further comprising one or more auxiliary Mono-Module Single-Winch Vector-Drag Drones (MMSVDDs), each MMSVDD including:

(i) a single underwater module including a geometry-adaptive drag-inducing structure and, when present, one or more control surfaces, the geometry-adaptive structure and/or the control surfaces being configured to modulate hydrodynamic drag magnitude and direction, and an auxiliary intermittent repositioning subsystem operative during non-pull phases;

(ii) a single tether coupled to the module;

(iii) a local controller; and (iv) a corresponding controllable winch mounted to the payload;

wherein the coordination controller is configured to command the MMSVDDs to operate cooperatively with the plurality of drones; and wherein the coordination controller is further configured to schedule the MMSVDDs in out-of-phase alternation of drag-generating and repositioning phases such that during operation, at least one MMSVDD supplies drag-based counter-force along a commanded axis, thereby ensuring continuity of net counter-force on the payload, and to utilize the MMSVDDs, in combination with the plurality of drones, to maintain a six-degrees-of-freedom pose of the payload within a controller-specified tolerance band.

3. The system of claim 1, wherein, for at least one of the drones, the corresponding winch includes an auxiliary retraction actuator configured, during hand-off intervals, to simultaneously retract the first and second tethers so as to eliminate a counter-force trough and provide continuous vector-drag output during the hand-off.

4. The system of claim 3, wherein the auxiliary retraction actuator comprises a piston-based linear mechanism arranged to pull both tethers via pulleys located proximate to respective winch ports, without interfering with primary winch operation.

5. The system of claim 1, wherein at least one of the drones comprises three or more underwater modules, and the local controller is configured to execute a multiphasic alternation cycle among the modules.

6. The system of claim 1, wherein, for at least one drone, the tether coupled to one module comprises a longitudinally openable containment-sleeve tether extending from a winch port to the module's axial through-passage, and the tether coupled to the other module is routed within the containment sleeve, the system further including a port-end opener/closer mechanism configured to selectively admit or release the other tether from the sleeve, thereby maintaining substantially collinear routing and preventing tether entanglement.

7. The system of claim 1, wherein, for at least one drone, the winch is configured to retract one tether and release the other at substantially equal magnitudes of linear speed during the alternating phases to maintain substantially constant tension.

8. The system of claim 1, wherein, for at least one drone, the winch includes an internal tether buffer configured to adjust a maximum separation between the modules while preserving synchronized retraction and release rates.

9. The system of claim 1, wherein, for at least one drone, at least one of the first and second modules includes a hollow-shaft motor having a through-bore that defines at least in part the axial through-passage.

10. The system of claim 1, wherein, for at least one drone, the first and second tethers are opposing runs of a continuous rope routed around a terminal pulley coupled to one of the modules, the dual-port winch driving the continuous rope to effect the alternating phases.

11. The system of claim 1, wherein the auxiliary intermittent repositioning subsystem of at least one module comprises a non-propeller repositioning mechanism operable in a non-cavitating regime.

12. The system of claim 1, wherein the coordination controller is distributed across the drones and/or the winches with peer-to-peer communication among drones via at least one of acoustic signaling, electromagnetic signaling, or tether-based signaling.

13. The system of claim 12, wherein, upon loss of a controller instance, the remaining instances reassign coordination tasks to maintain operation of the system.

14. The system of claim 1, wherein each module includes an inertial measurement unit and a tether-tension sensor, and the local controller for the drone uses said signals in closed-loop control of winch velocities and drag-geometry settings.

15. The system of claim 1, wherein at least one tether comprises a high-modulus polyethylene (HMPE) strength member, and the local controller enforces ramp-limit constraints and tension thresholds to maintain a working load limit.

16. The system of claim 1, wherein at least one tether is a hybrid electro-mechanical tether including integrated electrical conductors and/or optical fibers for power and/or telemetry.

17. The system of claim 1, wherein the drones are disposed around the payload along orthogonal axes to provide control authority in roll, pitch, yaw, surge, sway, and heave.

18. The system of claim 1, wherein the coordination controller schedules inter-agent out-of-phase alternation among different drones to maintain multi-axis continuity of counter-forces.

19. The system of claim 1, wherein at least one geometry-adaptive drag-inducing structure comprises a variable-porosity canopy including panels configured to modify porosity during deployment and recovery.

20. The system of claim 1, wherein at least one geometry-adaptive drag-inducing structure includes independently adjustable telescopic arms enabling asymmetric area deployment to generate controllable moments.

21. An underwater vector-drag dynamic positioning system for an underwater payload ("payload"), the system comprising:
  (a) a plurality of dual-module, single-winch, coaxial alternating vector-drag drones ("drones") spatially distributed around the payload and positioned such that respective tether lines-of-action are oriented to generate controllable forces and moments on the payload, each drone including:
    (i) a first underwater module including a geometry-adaptive drag-inducing structure and one or more control surfaces, the geometry-adaptive structure and/or the control surfaces being configured to modulate hydrodynamic drag magnitude and direction, and an auxiliary intermittent repositioning subsystem operative during non-pull phases;
    (ii) a second underwater module disposed coaxially with the first module including a geometry-adaptive drag-inducing structure and one or more control surfaces, the geometry-adaptive structure and/or the control surfaces being configured to modulate hydrodynamic drag magnitude and direction, and an auxiliary intermittent repositioning subsystem operative during non-pull phases;
    (iii) a first tether coupled to the first module and a second tether coupled to the second module;
    (iv) a local controller;
  (b) a corresponding plurality of controllable dual-port winches mounted to the payload, each winch having a first port driving the first tether and a second port driving the second tether of a corresponding drone, each winch being dedicated to a single corresponding drone;
  (c) for each drone, a coaxial routing in which at least one of the first and second modules defines an axial through-passage along a common longitudinal axis and the tether coupled to the other module passes through the axial through-passage such that the line-of-action of the tethers is maintained substantially collinear with the common longitudinal axis, thereby reducing yawing moments and tether interference during operation;
  (d) a coordination controller, implemented centrally and/or distributed across the payload, the drones, and/or the winches, in communication with the local controllers and the winches and configured to command winch velocities, drag-geometry settings, and operation of auxiliary intermittent repositioning subsystems, including onboard propulsion where present, for the plurality of drones, and to control the spatial disposition of the drones relative to the payload;
  (e) wherein, for each drone, the local controller, together with the corresponding winch, is configured to execute alternating phases in which, in a first phase, the winch retracts the first tether while releasing the second tether and, in a second phase, the winch retracts the second tether while releasing the first tether, the module undergoing release during each phase being positioned by its auxiliary intermittent repositioning subsystem, the local controller further being configured to command dynamic adjustment of the geometry-adaptive drag-inducing structures and the control surfaces to set the hydrodynamic drag vector, in both magnitude and direction, including, for at least one of the modules, independent of control surfaces, intentionally altering the deployed drag-inducing structure's geometry asymmetrically so as to produce a lateral component of hydrodynamic drag for attitude control, such that at least one of the modules remains in a drag-generating configuration throughout the alternating phases, thereby providing a substantially continuous vector-drag output for the corresponding drone; and, during each release phase, the local controller further being configured to steer the repositioning module to adjust its attitude in response to changes in the attitude of the module undergoing retraction, so that it remains substantially collinear with the common longitudinal axis of the module undergoing retraction, thereby suppressing yaw moments, minimizing tether interference, and maintaining the repositioning module's tether in tension along a line-of-action substantially collinear with the common longitudinal axis throughout operation, including during hand-off intervals;
  (f) wherein modulation of pulling velocities in combination with adjustment of the geometry-adaptive drag-inducing structures and the control surfaces provides primary translational traction and attitude control via hydrodynamic counter-forces that increase approximately with the square of the magnitude of the component of the relative velocity of the respective drag-inducing structure with respect to the surrounding fluid along the retracted tether;
  (g) wherein the coordination controller includes a state-estimation module configured to fuse inertial data with at least one of acoustic, electromagnetic, or tether-based measurements and to command the winches and the drones' local controllers to maintain a six-degrees-of-freedom pose of the payload within a controller-specified tolerance band around a target setpoint or along a commanded trajectory; and (h) wherein, for at least one of the drones, the corresponding winch includes an auxiliary retraction actuator configured, during hand-off intervals, to simultaneously retract the first and second tethers to pull both of the modules, thereby eliminating a counter-force trough and providing continuous vector-drag output during the hand-off.

22. An underwater vector-drag dynamic positioning system for an underwater payload ("payload"), the system comprising:

(a) a plurality of dual-module, single-winch, coaxial alternating vector-drag drones ("drones") spatially distributed around the payload and positioned such that respective tether lines-of-action are oriented to generate controllable forces and moments on the payload, each drone including:

(i) a first underwater module including a geometry-adaptive drag-inducing structure and one or more control surfaces, the geometry-adaptive structure and/or the control surfaces being configured to modulate hydrodynamic drag magnitude and direction, and an auxiliary intermittent repositioning subsystem operative during non-pull phases;

(ii) a second underwater module disposed coaxially with the first module including a geometry-adaptive drag-inducing structure and one or more control surfaces, the geometry-adaptive structure and/or the control surfaces being configured to modulate hydrodynamic drag magnitude and direction, and an auxiliary intermittent repositioning subsystem operative during non-pull phases;

(iii) a first tether coupled to the first module and a second tether coupled to the second module;

(iv) a local controller;

(b) a corresponding plurality of controllable dual-port winches mounted to the payload, each winch having a first port driving the first tether and a second port driving the second tether of a corresponding drone, each winch being dedicated to a single corresponding drone;

(c) for each drone, a coaxial routing in which at least one of the first and second modules defines an axial through-passage along a common longitudinal axis and the tether coupled to the other module passes through the axial through-passage such that the line-of-action of the tethers is maintained substantially collinear with the common longitudinal axis, thereby reducing yawing moments and tether interference during operation;

(d) a coordination controller, implemented centrally and/ or distributed across the payload, the drones, and/or the winches, in communication with the local controllers and the winches and configured to command winch velocities, drag-geometry settings, and operation of auxiliary intermittent repositioning subsystems, including onboard propulsion where present, for the plurality of drones, and to control the spatial disposition of the drones relative to the payload;

(e) wherein, for each drone, the local controller, together with the corresponding winch, is configured to execute alternating phases in which, in a first phase, the winch retracts the first tether while releasing the second tether and, in a second phase, the winch retracts the second tether while releasing the first tether, the module undergoing release during each phase being positioned by its auxiliary intermittent repositioning subsystem, the local controller further being configured to command dynamic adjustment of the geometry-adaptive drag-inducing structures and the control surfaces to set the hydrodynamic drag vector, in both magnitude and direction, including, for at least one of the modules, independent of control surfaces, intentionally altering the deployed drag-inducing structure's geometry asymmetrically so as to produce a lateral component of hydrodynamic drag for attitude control, such that at least one of the modules remains in a drag-generating configuration throughout the alternating phases, thereby providing a substantially continuous vector-drag output for the corresponding drone; and, during each release phase, the local controller further being configured to steer the repositioning module to adjust its attitude in response to changes in the attitude of the module undergoing retraction, so that it remains substantially collinear with the common longitudinal axis of the module undergoing retraction, thereby suppressing yaw moments, minimizing tether interference, and maintaining the repositioning module's tether in tension along a line-of-action substantially collinear with the common longitudinal axis throughout operation, including during hand-off intervals;

(f) wherein modulation of pulling velocities in combination with adjustment of the geometry-adaptive drag-inducing structures and the control surfaces provides primary translational traction and attitude control via hydrodynamic counter-forces that increase approximately with the square of the magnitude of the component of the relative velocity of the respective drag-inducing structure with respect to the surrounding fluid along the retracted tether;

(g) wherein the coordination controller includes a state-estimation module configured to fuse inertial data with at least one of acoustic, electromagnetic, or tether-based measurements and to command the winches and the drones' local controllers to maintain a six-degrees-of-freedom pose of the payload within a controller-specified tolerance band around a target setpoint or along a commanded trajectory;

(h) wherein, for at least one of the drones, the corresponding winch includes an auxiliary retraction actuator configured, during hand-off intervals, to simultaneously retract the first and second tethers to pull both of the modules, thereby eliminating a counter-force trough and providing continuous vector-drag output during the hand-off; and (i) wherein, for at least one drone, the tether coupled to one module comprises a longitudinally openable containment-sleeve tether extending from a winch port to the module's axial through-passage, and the tether coupled to the other module is routed within the containment sleeve, the system further including a port-end opener/closer mechanism configured to selectively admit or release the other tether from the sleeve, thereby maintaining substantially collinear routing and preventing tether entanglement.

<center>* * * * *</center>